(12) United States Patent
Yamamoto et al.

(10) Patent No.: US 8,068,525 B2
(45) Date of Patent: Nov. 29, 2011

(54) SOLID-STATE LASER ELEMENT

(75) Inventors: Shuhei Yamamoto, Tokyo (JP);
Takayuki Yanagisawa, Tokyo (JP);
Yasuharu Koyata, Tokyo (JP);
Yoshihito Hirano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 12/675,447

(22) PCT Filed: Aug. 30, 2007

(86) PCT No.: PCT/JP2007/066937
§ 371 (c)(1),
(2), (4) Date: Feb. 26, 2010

(87) PCT Pub. No.: WO2009/028079
PCT Pub. Date: Mar. 5, 2009

(65) Prior Publication Data
US 2010/0303112 A1    Dec. 2, 2010

(51) Int. Cl.
*H01S 3/04* (2006.01)
(52) U.S. Cl. .......................................... 372/36
(58) Field of Classification Search ............ 372/36
See application file for complete search history.

(56) References Cited

U.S. PATENT DOCUMENTS

| | | | |
|---|---|---|---|
| 4,674,095 A | 6/1987 | Heinen et al. | |
| 7,403,549 B2 | 7/2008 | Koyata et al. | |
| 2004/0179785 A1* | 9/2004 | Komiya et al. | 385/49 |
| 2004/0240500 A1 | 12/2004 | Mercer | |
| 2005/0276301 A1* | 12/2005 | Spinelli et al. | 372/72 |
| 2008/0095202 A1 | 4/2008 | Yanagisawa et al. | |

FOREIGN PATENT DOCUMENTS

| | | |
|---|---|---|
| JP | 60 218893 | 11/1985 |
| JP | 2003 510822 | 3/2003 |
| JP | 2004 536460 | 12/2004 |
| JP | 2006 196882 | 7/2006 |
| WO | 2006 103767 | 10/2006 |

OTHER PUBLICATIONS

Mackenzie, Jacob I. et al., "Multi-Watt, High Efficency, Diffraction-Limited Nd:YAG Planar Waveguide Laser", IEEE Journal of Quantum Electronics, vol. 39, No. 3, pp. 493-500, (Mar. 2003).
U.S. Appl. No. 12/669,966, filed Jan. 21, 2010, Yanagisawa, et al.
U.S. Appl. No. 12/677,827, filed Mar. 12, 2010, Koyata, et al.

* cited by examiner

*Primary Examiner* — Patrick Stafford
(74) *Attorney, Agent, or Firm* — Oblon, Spivak, McClelland, Maier & Neustadt, L.L.P.

(57) ABSTRACT

To achieve a solid-state laser element capable of outputting a high-power laser, in a planar waveguide type solid-state laser element that causes a plurality of fundamental laser beams to oscillate in a direction of an optic axis within a flat plate-like laser medium, and forms a waveguide structure in a thickness direction of the laser medium, which is a direction perpendicular to a principal surface of the flat plate-like laser medium, the laser medium is separated in a principal-surface width direction of the laser medium, which is a direction perpendicular to the direction of the optic axis and the thickness direction of the laser medium, by a groove extending in the direction of the optic axis within the laser medium.

12 Claims, 12 Drawing Sheets

(1) POLISHING (3) POLISHING (4) CUTTING (5) BONDING BY BONDING AGENT

US 8,068,525 B2

SOLID-STATE LASER ELEMENT

TECHNICAL FIELD

The present invention relates to a solid-state laser element that outputs a laser beam while oscillating the laser beam within a flat plate-like planar waveguide.

BACKGROUND ART

An apparatus that displays a color image, such as a printer or a projection television, requires, as a light source, light sources of three colors: red (R), green (G), and blue (B). In recent years, as these light sources, there has been developed a wavelength conversion laser device (a laser system) that sets laser beams in the 900 nm band, the 1 μm band, and the 1.3 μm band as fundamental laser beams, and converts a fundamental laser beam into a second harmonic (SHG: Second Harmonic Generation) with a nonlinear material. In the SHG, to achieve a high conversion efficiency of the conversion from the fundamental laser beam to the second harmonic laser beam, the wavelength conversion laser device is required to increase a power density of the fundamental laser beam on the nonlinear material and to make the fundamental laser beam into a high-brightness laser beam with a small wavefront aberration.

A two-dimensional waveguide laser can increase a power density of a fundamental laser beam, so that the two-dimensional waveguide laser can achieve a high conversion efficiency of conversion from a fundamental laser beam to a second harmonic laser beam. However, the two-dimensional waveguide laser has a breaking limit due to the high power density, so that the two-dimensional waveguide laser is limited in high power operation. Furthermore, an output of an LD (Laser Diode) beam with a high beam quality in a two-dimensional direction connectable to a two-dimensional waveguide (in the same plane as the two-dimensional waveguide) is generally low, so that the two-dimensional waveguide laser is limited in high power operation.

Consequently, for the high power operation of the second harmonic laser beam, a planar waveguide laser in which a one-dimensional waveguide is structured is sometimes used. In the planar waveguide laser, to achieve high-power operation, a laser beam is oscillated in a spatial mode, i.e., in a direction perpendicular to a laser beam axis (a direction perpendicular to a principal surface of a flat plate) within a flat-plate plane thereby widening a beam diameter of the laser beam in the direction perpendicular to the laser beam axis or converting the laser beam into multiple beams. In such a planar waveguide laser in which a one-dimensional waveguide is structured, LD beams as a pumping source are just to be coupled in a one-dimensional direction in a planar waveguide. Thus, a high-power broad-area LD can be used in the planar waveguide laser in which the one-dimensional waveguide is structured, and as a result, a high-power laser beam can be obtained. Furthermore, a multi-emitter LD in which light-emitting points of LD beams are arranged in the one-dimensional direction can be used in the planar waveguide laser in which the one-dimensional waveguide is structured, and thus it is possible to obtain a higher-power laser output than the broad-area LD is used (see Non-patent document 1).

Non-patent document 1: IEEE J. Quantum Electronics Vol. 39 (2003), 495

DISCLOSURE OF INVENTION

Problem to be Solved by the Invention

However, in the above-described conventional planar waveguide laser, when a beam diameter of a laser beam is widened in the direction perpendicular to the laser beam axis (a thickness direction of the flat-plate plane) or when a laser beam is converted into multiple beams, a size of the flat-plate plane in a width direction has to be widened. If the size of the flat-plate plane in the width direction is wide, a gain in the width direction of the flat-plate plane is increased, which may cause a parasitic oscillation, and failing to obtain a high-power laser output.

Furthermore, even when it does not reach the parasitic oscillation, if a gain in a direction of the laser beam axis is decreased by an extraction of energy due to amplification of a spontaneous emission light, it is not possible to obtain a high-power laser output.

The present invention has been made in view of the above problems, and an object of the present invention is to achieve a solid-state laser element capable of outputting a high-power laser.

Means for Solving Problem

In order to solve the above problem, and to attain the above object, in a planar waveguide type solid-state laser element of the present invention that causes a plurality of fundamental laser beams to oscillate in an optical axis direction within a flat plate-like laser medium, and forms a waveguide structure in a thickness direction, which is a direction perpendicular to a principal surface of the flat plate-like laser medium, the laser medium is separated in a principal-surface width direction, which is a direction perpendicular to the optical axis direction and the thickness direction, by a groove extending in the optical axis direction within the laser medium.

Effect of the Invention

A solid-state laser element according to the present invention is separated in a principal-surface width direction of the solid-state laser element by a groove extending in an optical axis direction within a laser medium, so that a laser propagation distance in the principal-surface width direction can be shortened, and a high-power laser can be output with a gain in a direction other than the optical axis direction suppressed.

Figure 1:
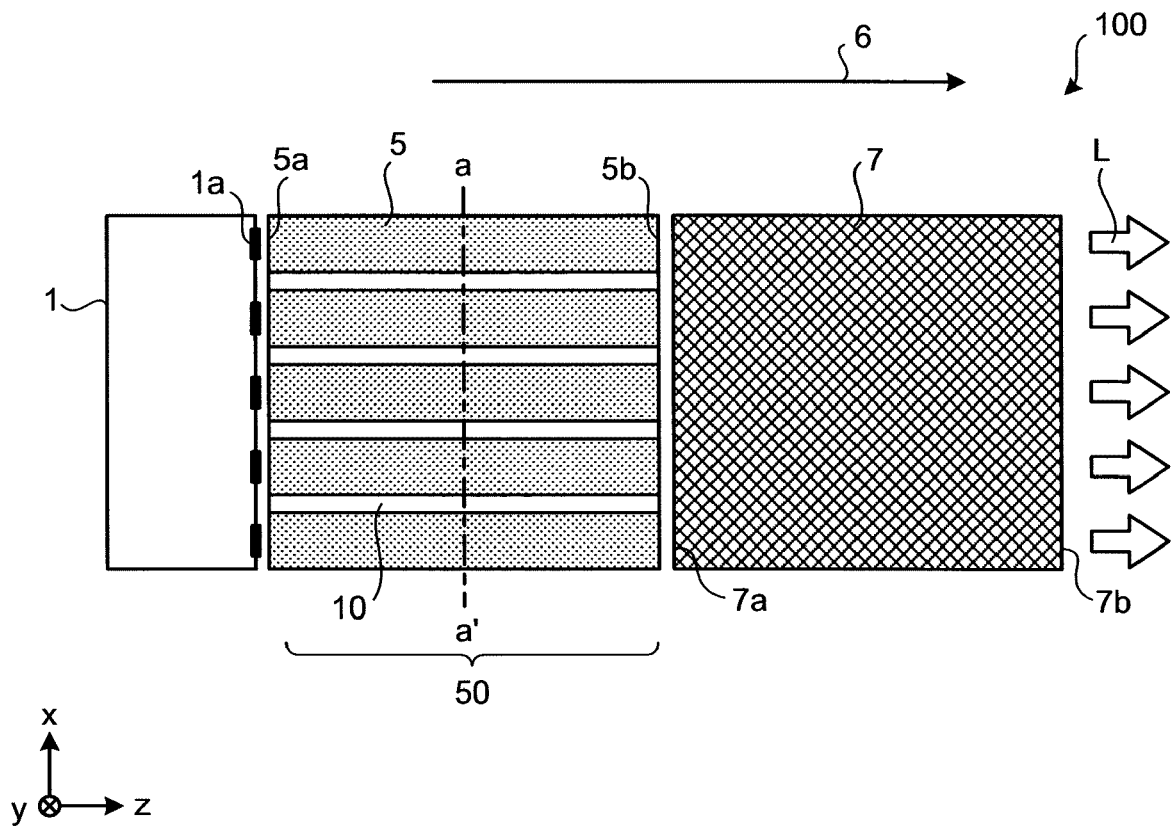
FIG. 1 is a top view illustrating a configuration of a wavelength conversion laser device according to an embodiment of the present invention.

EXPLANATIONS OF LETTERS OR NUMERALS 1 semiconductor laser
1a active layer
2 heat sink
2, 2b heat sink
3, 3a, 3b bonding agent
4, 4a, 4b cladding
5 laser medium
5a-5c, 7a, 7b end surface
6 optic axis
7 nonlinear material
10, 17 groove
11 substrate
20 absorbing agent
50 solid-state laser element
100 wavelength conversion laser device
L second harmonic laser beam
N spontaneous emission light
T heat flow

BEST MODE(S) FOR CARRYING OUT THE INVENTION

A solid-state laser element according to an embodiment of the present invention is explained in detail below with reference to the accompanying drawings. Incidentally, the invention is not limited by the embodiment.

Embodiment(s)

Figure 2:
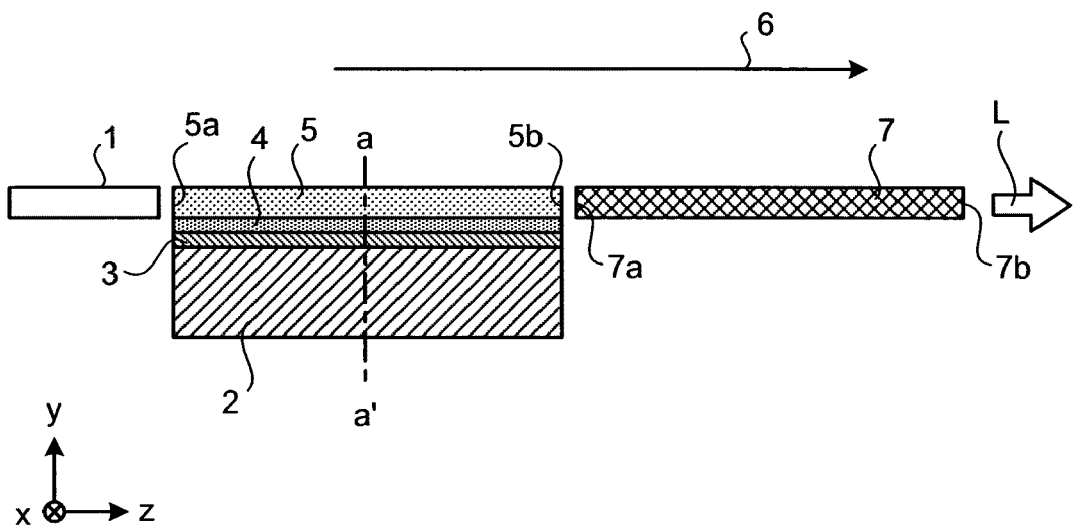
FIG. 2 is a cross-sectional view of the configuration of the wavelength conversion laser device according to the embodiment of the present invention from a lateral view.

FIG. 1 is a top view illustrating a configuration of a wavelength conversion laser device according to an embodiment of the present invention, and FIG. 2 is a cross-sectional view of the configuration of the wavelength conversion laser device according to the embodiment of the present invention from a lateral view. Incidentally, in FIGS. 1 and 2, an optical axis representing a laser oscillation direction is denoted by an optic axis 6.

A planar waveguide type wavelength conversion laser device 100 is a laser system in which grooves (groove wall surfaces) are formed on a laser medium to suppress a parasitic oscillation and an extraction of energy due to amplification of a spontaneous emission light in a direction other than the direction of the laser beam axis (the optic axis 6). The wavelength conversion laser device 100 is used, for example, in the optical information processing field and the like, as a light source of a laser display device or an optical memory device. The wavelength conversion laser device 100 includes a semiconductor laser 1, a nonlinear material (a nonlinear optical material) 7, and a solid-state laser element 50 as a main feature of the present invention.

The semiconductor laser 1 outputs a plurality of LD beams from a plurality of active layers. To output a plurality of LD beams, the semiconductor laser 1 emits the LD beams in an array, and causes the solid-state laser element 50 to perform a multi-emitter oscillation. The solid-state laser element 50 is a planar waveguide type element that oscillates a fundamental laser beam, and includes a heat sink 2, a bonding agent 3, a cladding (a low refractive index unit) 4, and a laser medium 5. The nonlinear material (a wavelength conversion element) 7 is an element that converts the oscillated fundamental laser beam into a second harmonic laser beam and emits a portion of the converted second harmonic laser beam. The nonlinear material 7 has a slab waveguide structure.

In what follows, for the sake of convenience of explanation, the optic axis 6 shall be a z-axis direction, a direction perpendicular to a principal surface of the wavelength conversion laser device 100 shall be a y-axis direction (a thickness direction), and a direction perpendicular to both the z-axis and the y-axis shall be an x-axis direction (a principal-surface width direction).

The semiconductor laser 1, the laser medium 5, and the nonlinear material 7 are each formed into a substantially rectangular flat plate, and provided in the same plane so that respective flat plate-like principal surfaces are parallel to the xz plane. The laser medium 5 is provided between the semiconductor laser 1 and the nonlinear material 7 so that one of side surfaces of the laser medium 5 (an end surface 5a perpendicular to the z-axis) is adjacent to the semiconductor laser 1 and the opposed side surface to the one (an end surface 5b perpendicular to the z-axis) is adjacent to the nonlinear material 7.

The nonlinear material 7 has end surfaces 7a and 7b those perpendicular to the optic axis 6, and is arranged so that the end surface 7a is adjacent to the end surface 5b of the laser medium 5. The end surface 7b of the nonlinear optical material 7 is an end surface on the side from which a second harmonic laser beam L is emitted.

The respective adjacent surfaces of the semiconductor laser 1 and the laser medium 5 have about the same planar shape (substantially rectangular shape), and the respective adjacent surfaces of the laser medium 5 and the nonlinear material 7 have about the same planar shape (substantially rectangular shape). In other words, in the wavelength conversion laser device 100, the semiconductor laser 1, the solid-state laser element 50, and the nonlinear material 7 are provided so that an LD-beam exit surface of the semiconductor laser 1, the end surfaces 5a and 5b of the laser medium 5, and the end surfaces 7a and 7b of the nonlinear material 7 are parallel to one another.

A cooling heat sink (not shown) can be bonded to the semiconductor laser 1 if needed. A width of the semiconductor laser 1 in the x-axis direction is about equal to a width of the laser medium 5 in the x-axis direction, and the semiconductor laser 1 outputs an excitation light in the x-axis direction almost uniformly. The semiconductor laser 1 is, for example, a multi-emitter semiconductor laser in which a plurality of active layers 1a that output LD beams are arranged or the like. When the semiconductor laser 1 is the multi-emitter semiconductor laser, in the semiconductor laser 1, the active layers 1a are each arranged so that the active layers 1a are aligned in the x-axis direction of the side surface adjacent to the end surface 5a. In this case, a plurality of LD beams are output from a plurality of the active layers 1a, so that the semiconductor laser 1 can obtain laser output beams from a plurality of the active layers 1a aligned in the x-axis direction. The LD beams output from the semiconductor laser 1 are incident from the end surface 5a on the laser medium 5 in an xz plane direction (a direction perpendicular to the xy plane) (a direction of the optic axis 6), and are absorbed by the laser medium 5.

The end surface 5a of the laser medium 5 is a total reflection film that reflects a fundamental laser beam, and the end surface 5b of the laser medium 5 is an antireflection film that lets the fundamental laser beam therethrough. The end surface 7a of the nonlinear material 7 is an optical film (a partial reflection film) that lets the fundamental laser beam therethrough and reflects the second harmonic laser beam L, and the end surface 7b of the nonlinear material 7 is an optical film (a partial reflection film) that reflects the fundamental laser beam and lets the second harmonic laser beam L therethrough. These total reflection film, antireflection film, and optical films are produced, for example, by laminating dielectric thin films. Incidentally, when the excitation light output from the semiconductor laser 1 is incident from the end surface 5a of the laser medium 5, the total reflection film of the end surface 5a is changed to an optical film that lets the excitation light therethrough and reflects the fundamental laser beam.

The laser medium 5 has, for example, a thickness in the y-axis direction of several to several tens μm and a width in the x-axis direction of several hundreds μm to several mm. As the laser medium 5, a common solid-state laser material can be used. The laser medium 5 is, for example, Nd:YAG; Nd:YLF; Nd:Glass; Nd:YVO₄; Nd:GdVO₄; Yb:YAG; Yb:YLF; Yb:KGW; Yb:KYW; Er:Glass; Er:YAG; Tm:YAG; Tm:YLF; Ho:YAG; Ho:YLF; Tm,Ho:YAG; Tm,Ho:YLF; Ti:Sapphire; Cr:LiSAF; or the like.

The cladding 4 has a smaller refractive index than that of the laser medium 5, and one surface parallel to the xz plane of the laser medium 5 (an upper surface of the cladding 4) is bonded to the lower surface side of the laser medium 5. The cladding 4 is produced by, for example, a method of evaporating a film made from an optical material on the laser medium 5 or a method of optically-bonding an optical material to the laser medium 5 by optical contact, diffusion bonding, or the like.

The heat sink 2 is constructed of a material having a large thermal conductivity, and bonded to the cladding 4 on the lower surface side of the cladding 4 via the bonding agent 3. The bonding agent 3 exhausts heat generated in the laser medium 5 into the heat sink 2 via the cladding 4. As the bonding agent 3, for example, a metal solder, an optical adhesive, a thermal conductive adhesive, or the like is used. To increase the strength of bonding with the bonding agent 3, the surface of the cladding 4 opposed to the surface bonded to the laser medium 5 (the lower surface) can be metalized (be coated with a metal film). Furthermore, when the heat sink 2 is constructed of an optical material, the cladding 4 and the heat sink 2 can be directly bonded together, for example, by optical contact, diffusion bonding, or the like. In this way, the heat sink 2, the bonding agent 3, the cladding 4, and the laser medium 5 form a laminated structure in the y-axis direction.

As the nonlinear material 7, a common wavelength conversion material can be used. As the nonlinear material 7, for example, KTP, KN, BBO, LBO, CLBO, LiNbO₃, LiTaO₃, or the like is used. Furthermore, if MgO-doped LiNbO₃, MgO-doped LiTaO₃, stoichiometric LiNbO₃, or stoichiometric LiTaO₃, which are resistant to optical damage, is used as the nonlinear material 7, a power density of the incident fundamental laser beam can be increased, so that a high-efficient wavelength conversion becomes possible. Moreover, if MgO-doped LiNbO₃, MgO-doped LiTaO₃, stoichiometric LiNbO₃, stoichiometric LiTaO₃, or KTP, which have a periodically poled structure, is used as the nonlinear material 7, a nonlinear constant is large, so that a higher-efficient wavelength conversion becomes possible.

In the present embodiment, one to a plurality of grooves 10 are formed on the laser medium 5. Each of the grooves 10 is arranged so that an individual groove wall surface (side surface) is aligned in a direction substantially parallel to the optic axis 6. The groove wall surface of each groove 10 extends from the end surface 5a to the end surface 5b in the direction of the optic axis 6 while being in the perpendicular direction to the principal surface of the laser medium 5. The grooves 10 are arranged between respective LD beams output from the active layers 1a of the semiconductor laser 1 (between respective optical axes of the LD beams). Consequently, the laser medium 5 in the present embodiment is optically separated (divided) into several pieces by the grooves 10. Thus, one LD beam output from one of the active layers 1a of the semiconductor laser 1 is propagated through the laser medium 5 within an area sandwiched between the adjacent grooves 10, and absorbed by the laser medium 5.

Incidentally, when an extraction of energy from a spontaneous emission light in the x-axis direction is small, the grooves 10 can be arranged with respect to each of a plurality of LD beams output from a plurality of the active layers 1a. In other words, the grooves 10 are provided in the laser medium 5 so that a plurality of LD beams (a set of LD beams) are propagated through within an area sandwiched between a pair of the adjacent grooves 10. In this case, the number of the grooves 10 to be provided can be reduced than a case where the grooves 10 are provided with respect to each one of LD beams (a case where one LD beam is sandwiched between the adjacent grooves 10), so that the configuration of the laser medium 5 is simplified, and thus the laser medium 5 can be easily produced.

Figure 3:
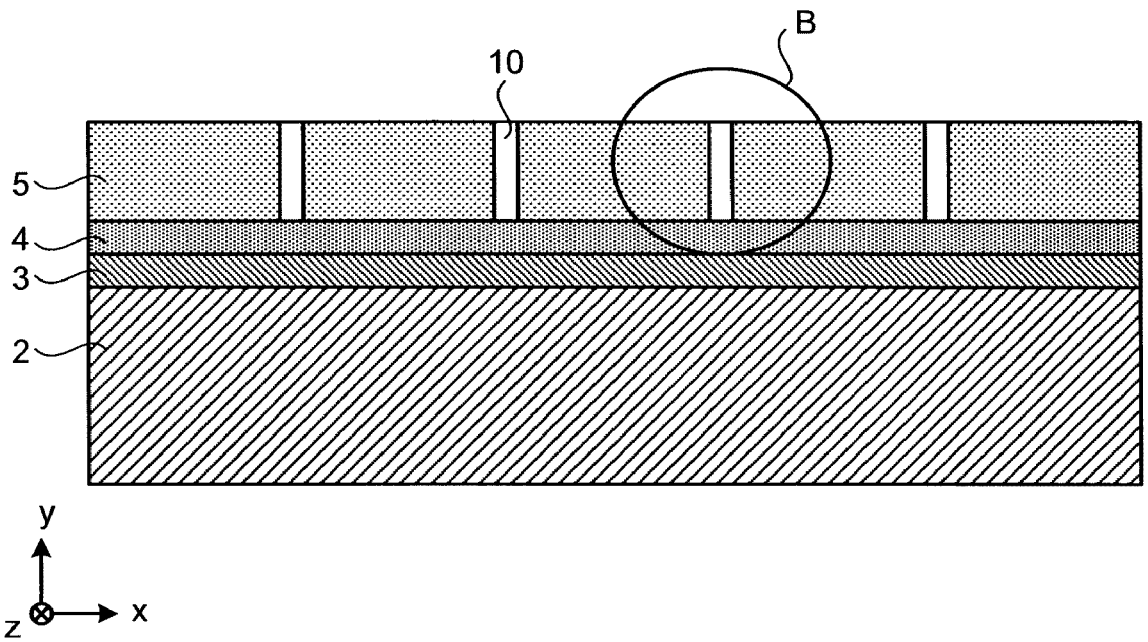
FIG. 3 is a cross-sectional view (1) along the line a-a' shown in FIGS. 1 and 2.
Figure 4:
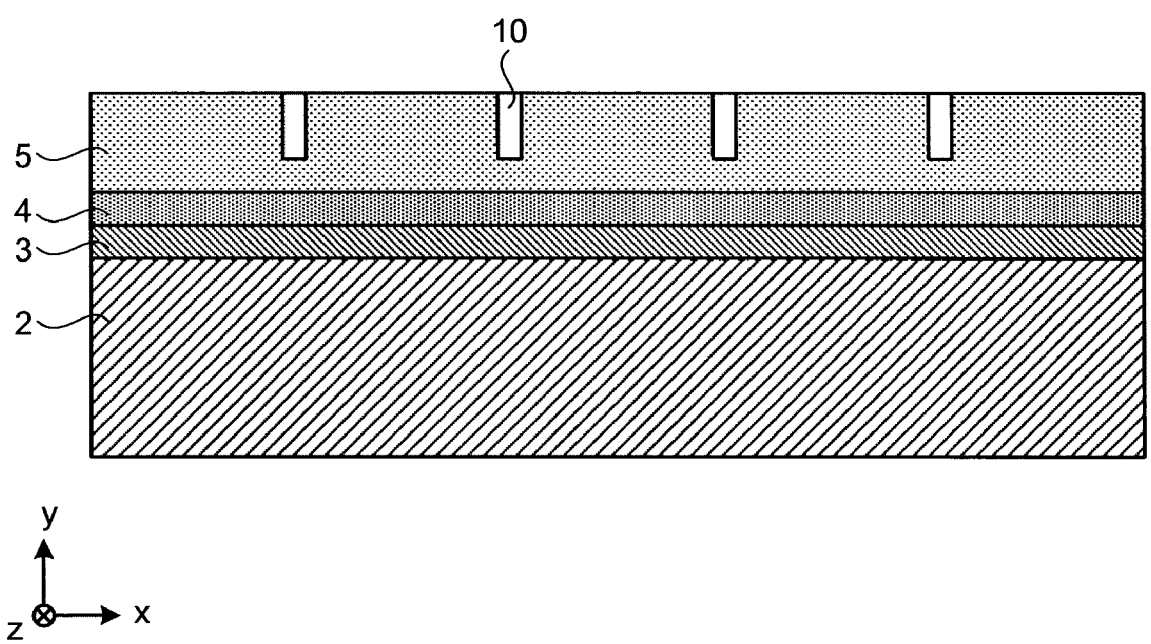
FIG. 4 is a cross-sectional view (2) along the line a-a' shown in FIGS. 1 and 2.

FIG. 3 is a cross-sectional view (1) along the line a-a' shown in FIGS. 1 and 2. FIG. 4 is a cross-sectional view (2) along the line a-a' shown in FIGS. 1 and 2. A depth of the groove 10 in the y-axis direction can be equal to a thickness of the laser medium 5 in the y-axis direction as shown in FIG. 3, or can be shallower than the thickness of the laser medium 5 in the y-axis direction as shown in FIG. 4.

Incidentally, FIG. 4 shows a case where the grooves 10 are formed on the upper surface side of the laser medium 5. Alternatively, the grooves 10 can be formed on the lower surface side of the laser medium 5. Furthermore, the grooves 10 can be formed from the both sides of the upper and lower surfaces of the laser medium 5. Moreover, the grooves 10 can be formed near a middle portion of the laser medium 5.

The operating procedure of the wavelength conversion laser device 100 is explained below. An excitation light from the semiconductor laser 1, which is incident from the end surface 5a of the laser medium 5, is absorbed by the laser medium 5, and a gain to a fundamental laser beam is produced inside the laser medium 5. By the gain produced in the laser medium 5, the fundamental laser beam is oscillated between the end surface 5a of the laser medium 5 and the end surface 7b of the nonlinear material 7 those perpendicular to the optic axis 6.

Figure 5:
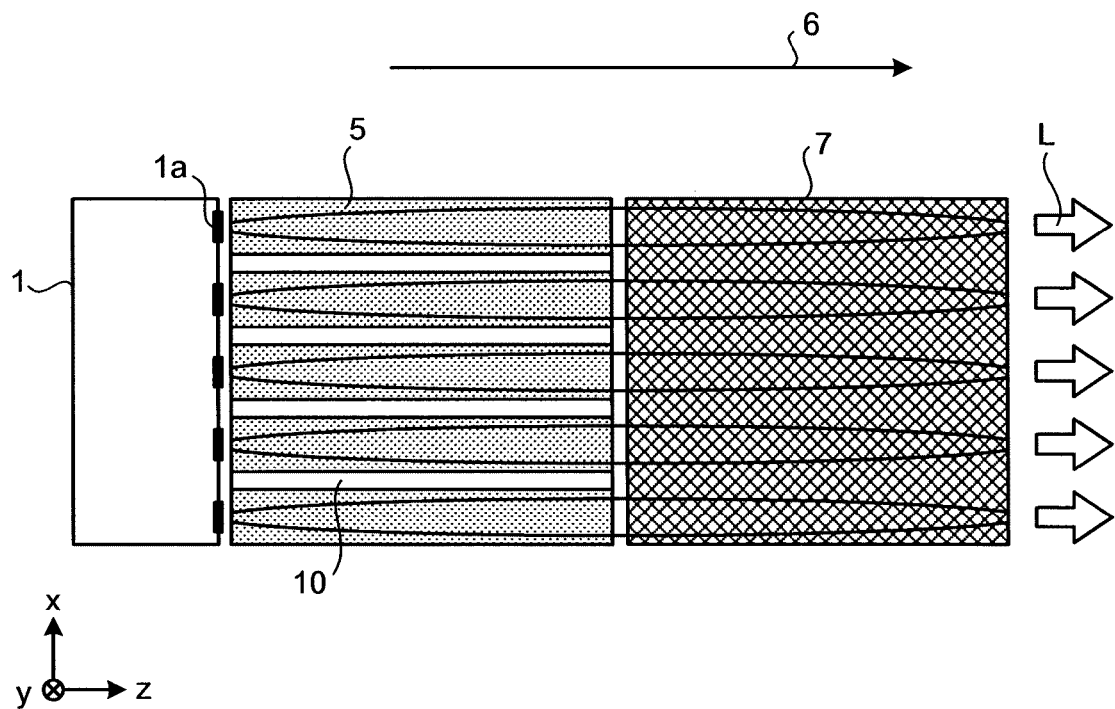
FIG. 5 is a diagram for explaining an oscillation mode of a laser beam.

FIG. 5 is a diagram for explaining an oscillation mode of a laser beam. An angle of a crystal axis, a temperature, a period of periodic poling, and the like of the nonlinear material 7 are optimized so that the fundamental laser beam is converted into a second harmonic laser beam L by the nonlinear effect. Therefore, when the fundamental laser beam oscillated between the end surface 5a and the end surface 5b is incident on the nonlinear material 7, a portion of the fundamental laser beam is converted into a second harmonic laser beam L, and the second harmonic laser beam L is output to the outside from the end surface 7b.

The fundamental laser beam that is not converted into the second harmonic laser beam L and remains in the nonlinear material 7 is totally reflected by the end surface 7b, again passes through the nonlinear material 7, and is converted into a second harmonic laser beam L. The second harmonic laser beam L produced by the conversion of a portion of the remaining fundamental laser beam is totally reflected by the end surface 7a, and output to the outside from the end surface 7b.

The thickness of the laser medium 5 in the y-axis direction is about several to dozens times as thick as a wavelength of the laser beam, and the laser medium 5 is sandwiched between the cladding 4 having a smaller refractive index than that of the laser medium 5 and the air, so that the laser medium 5 operates as a waveguide that the fundamental laser beam is confined in the laser medium 5 having a high refractive index. Consequently, the laser medium 5 forms a waveguide structure in the y-axis direction, and the fundamental laser beam in the laser medium 5 is oscillated in a predetermined mode of the waveguide (a laser oscillation mode) selectively. The mode of the waveguide can be arbitrarily set by adjusting the refractive index of the cladding 4 or the thickness of the laser medium 5 in the y-axis direction. Consequently, in the mode of the waveguide, waves are guided only in a low-order mode or a single mode, and thereby achieving a high-intensity oscillation.

In the laser medium 5, a refractive-index distribution is also produced in the y-axis direction by a thermal distribution produced by exhaust heat; however, if a difference in refractive index between the cladding 4 and the laser medium 5 and a difference in refractive index between the air and the laser medium 5 are sufficiently large as compared with a refractive index change due to the thermal distribution, the mode of the waveguide becomes dominant, and an impact of the heat in the y-axis direction can be ignored. In the present embodiment, the cladding 4 and the laser medium 5, which meet the condition that the difference in refractive index between the cladding 4 and the laser medium 5 and the difference in refractive index between the air and the laser medium 5 are sufficiently larger values than the refractive index change due to the thermal distribution, are used in the wavelength conversion laser device 100.

The upper and lower surfaces of the nonlinear material 7 perpendicular to the y-axis are sandwiched by the air or a cladding (not shown). The air and the cladding have a smaller refractive index than that of the nonlinear material 7. Furthermore, the thickness of the nonlinear material 7 in the y-axis direction is about several to dozens times as thick as a wavelength of the laser beam, so that the nonlinear material 7 in the y-axis direction operates as a waveguide in the same manner as the laser medium 5. Consequently, as shown in FIG. 5, the laser beam is put in the oscillation mode by the laser medium 5 and the nonlinear material 7.

Incidentally, when the nonlinear material 7 generates heat by absorbing the laser beam, the heat absorbed in the nonlinear material 7 can be exhausted out of the nonlinear material 7 by bonding the heat sink to the lower surface of the nonlinear material 7 or the cladding (not shown) bonded to the nonlinear material 7.

For example, when the heat sink is directly bonded to the nonlinear material 7, by using, as a material of the heat sink, an optical material having a smaller refractive index than that of the nonlinear material 7 or a bonding agent (for example, an optical adhesive or the like) having a smaller refractive index than that of the nonlinear material 7, the y-axis direction of the nonlinear material 7 can be used as a waveguide. In other words, in the nonlinear material 7 and the solid-state laser element 50, a waveguide structure is formed in a vertical direction (the y-axis direction).

A mode of laser oscillation in the y-axis direction within a laser resonator (from the end surface 5a of the laser medium 5 to the end surface 7b of the nonlinear material 7) in the z-axis direction is selectively set depending on the mode of the waveguide of the laser medium 5 or the mode of the waveguide of the nonlinear material 7. Each of the mode of the waveguide of the laser medium 5 and the mode of the waveguide of the nonlinear material 7 can be arbitrarily set by adjusting the thickness of the laser medium 5 in the y-axis direction or the difference in refractive index from the cladding. Therefore, in the mode of the waveguide of the laser medium 5 or the mode of the waveguide of the nonlinear material 7, waves are guided only in the low-order mode or the single mode, and thereby achieving a high-intensity oscillation.

The waveguide mode of the laser medium 5 and the waveguide mode of the nonlinear material 7 can be the same waveguide mode, or can be different waveguide modes. For example, when either one of the waveguide modes shall be the multi-mode and the other waveguide mode shall be the single mode, the mode of laser oscillation is limited to the lowest order mode, so that it is possible to selectively oscillate in the single mode.

A mode of laser oscillation in the x-axis direction within the laser resonator in the z-axis direction is the spatial mode without any mode selection based on the waveguide mode because the widths of the laser medium 5 and the nonlinear material 7 are sufficiently larger than the wavelengths of the fundamental laser beam and the second harmonic laser beam L.

Figure 6:
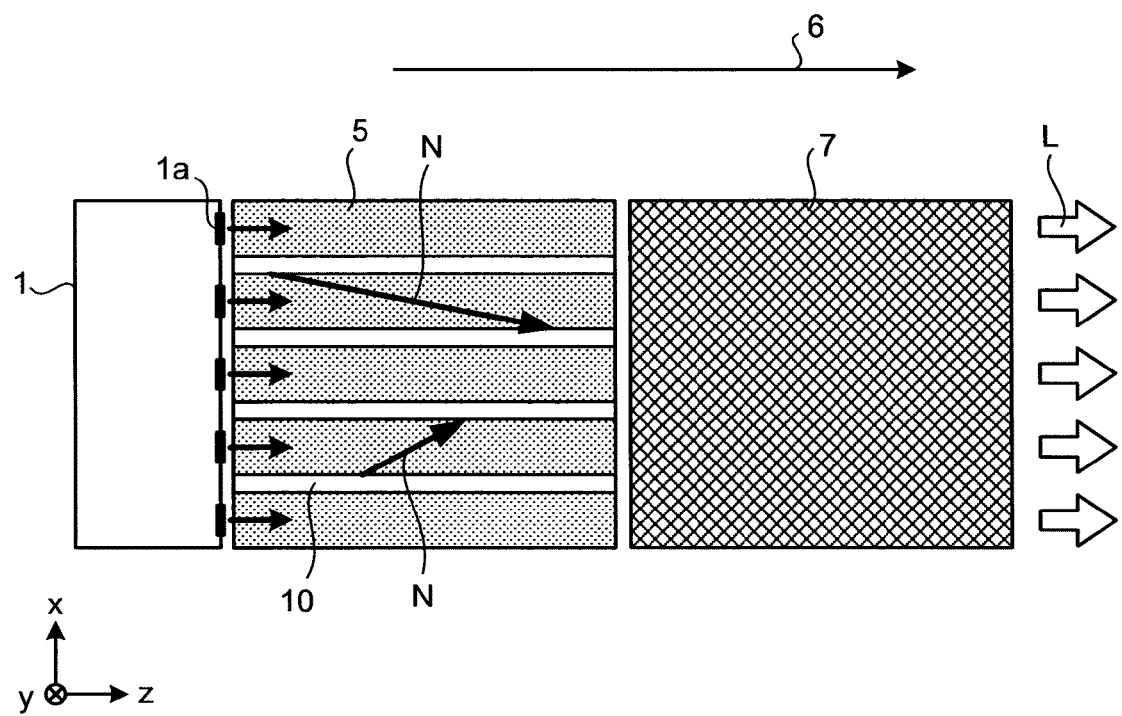
FIG. 6 is a diagram for explaining a spontaneous emission light of a laser medium.

FIG. 6 is a diagram for explaining a spontaneous emission light of the laser medium. The laser medium 5 excited by the LD beams emits a spontaneous emission light N in all directions, and performs an oscillation of laser while resonating a laser beam in the direction of the optic axis 6. Therefore, if an unintended parasitic oscillation in a direction other than the optic axis 6 or an extraction of energy due to amplification of the spontaneous emission light N occurs, a gain in the direction of the optic axis 6 is reduced, and a laser output power is decreased.

For example, out of the spontaneous emission light N propagated through the laser medium 5 at an angle including a component of the x-direction, a component meeting the total reflection angle on all the side surfaces of the laser medium 5 and all boundary surfaces (the upper and lower surfaces) of the laser medium 5 may sometimes be propagated through the waveguide at the angle including the component of the x-direction and amplified. When a semiconductor laser that is wide in the x-direction or a semiconductor laser in which a plurality of the active layers 1a is arranged is used as a pumping source, a gain of the spontaneous emission light N propagated through the laser medium 5 in a direction including the component of the x-direction is increased, so that a parasitic oscillation from a total reflection within the laser medium 5 easily occurs.

Furthermore, even when it does not reach a parasitic oscillation threshold, by extraction of energy due to the amplification of the spontaneous emission light N propagated through the laser medium 5 in the direction including the x-direction, a gain in the direction of the optic axis 6 is reduced, and a high-power laser output cannot be obtained.

In this manner, the spontaneous emission light N generated in the laser medium 5 is propagated through the laser medium 5 and amplified. When the energy extracted by the amplification of the spontaneous emission light N is sufficiently smaller than an energy of the LD beams absorbed by the laser medium 5, an amplification factor of the spontaneous emission light N is exponentially amplified with respect to a distance for the spontaneous emission light N to be propagated through the laser medium 5. Therefore, if the propagation distance of the spontaneous emission light N propagated through the laser medium 5 is long, the exponentially-stored energy is extracted, and the gain in the direction of the optic axis 6 is reduced. Consequently, with respect to the spontaneous emission light N propagated through the waveguide at the angle including the component of the x-direction, the propagation distance in the x-direction is shortened, so that the extraction of energy due to the amplification of the spontaneous emission light N can be suppressed, and a high-power laser beam can be generated in the direction of the optic axis 6.

In the present embodiment, the grooves 10 are arranged between respective optical axes of a plurality of LD beams output from a plurality of the active layers 1a of the semiconductor laser 1 so as to be substantially parallel to the optic axis 6, and thereby shortening the propagation distance of the spontaneous emission light N in the x-direction. Consequently, in the laser medium 5, the propagation of the spontaneous emission light N in the x-direction is blocked by the grooves 10, and thus the amplification of the spontaneous emission light N in the x-direction is reduced. Therefore, even when a semiconductor laser that is wide in the x-direction or a semiconductor laser in which a plurality of the active layers 1a is arranged is used as a pumping source, a parasitic oscillation and an extraction of energy due to amplification of a spontaneous emission light N are lessened, and a decrease in gain in the direction of the optic axis 6 is reduced. Consequently, the wavelength conversion laser device 100 can obtain a high-power laser output.

Figure 7:
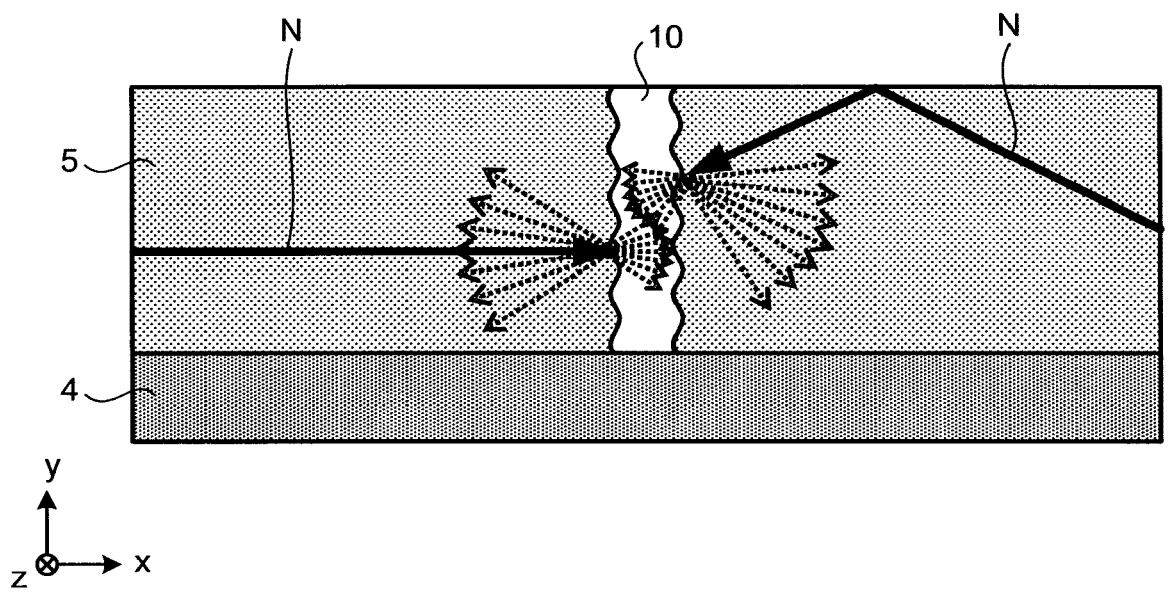
FIG. 7 is an enlarged view (1) of a portion B shown in FIG. 3.

FIG. 7 is an enlarged view (1) of a portion B shown in FIG. 3. The side surface (boundary surface) of the groove 10 in contact with the laser medium 5 can be an optical surface with a high figure or a roughened surface. FIG. 7 shows a case where the side surface of the groove 10 in contact with the laser medium 5 is a roughened surface. In this case, the spontaneous emission light N incident on the roughened surface (the side surface) of the groove 10 from the side of the laser medium 5 is permeated by the groove 10 while a portion of the laser beam is diffused by the roughened surface of the groove 10, and also reflected while a portion of the laser beam is diffused by the roughened surface of the groove 10. The diffused portion of the spontaneous emission light N deviates from the condition of the total reflection of the waveguide, and is multiply-reflected between the side surfaces of the laser medium 5 those opposed to the adjacent two grooves 10 (between the groove 10 and the groove 10). Consequently, the spontaneous emission light N to be amplified is decreased, so that a decrease in gain in the direction of the optic axis 6 due to the extraction of energy is reduced. Thus, it is possible to obtain a high-power laser output.

Figure 8:
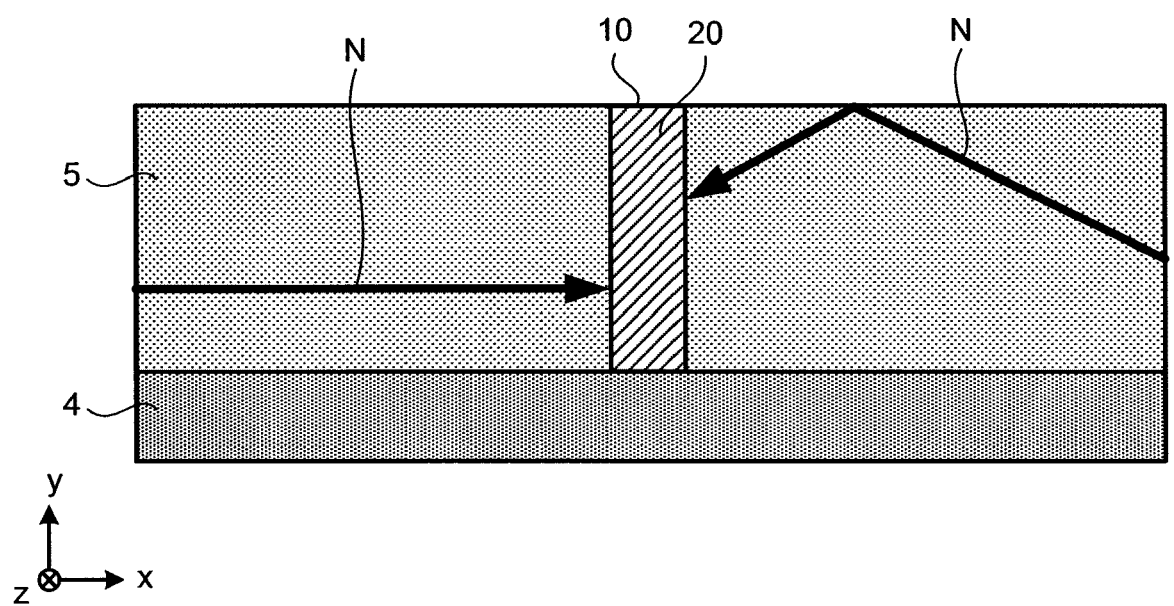
FIG. 8 is an enlarged view (2) of the portion B shown in FIG. 3.

Incidentally, the portion B shown in FIG. 3 can have another configuration. FIG. 8 is an enlarged view (2) of the portion B shown in FIG. 3. In the wavelength conversion laser device 100 shown in FIG. 8. The inside of the groove 10 is filled with an absorbing agent 20 that absorbs the spontaneous emission light N. Incidentally, FIG. 8 shows a case where the inside of the groove 10 is completely filled with the absorbing agent 20. Alternatively, the absorbing agent 20 can be applied to a portion of the side surface of the groove 10, the boundary surface with the laser medium 5.

The absorbing agent 20 inside the groove 10 can be a high heat-resistant polyimide material or dye, Cr, Ni, or other metals, a carbon material, carbon nanotube, other laser media capable of absorbing a wavelength of the spontaneous emission light N, an oxide of the laser medium 5 that is produced when the grooves 10 are formed, or the like. Incidentally, the side surface (the groove wall surface) of the groove 10 shown in FIG. 8 can be a roughened surface or an optical surface with a high figure.

In this manner, as the inside of the groove 10 is filled with the absorbing agent 20 that absorbs the spontaneous emission light N, the spontaneous emission light N, which is generated in the laser medium 5 and amplified, is absorbed by the absorbing agent 20, so that it is possible to reduce a rate of the spontaneous emission light N reflected by the boundary of the groove 10 and the laser medium 5 (the side surface of the groove 10) greatly. Consequently, the parasitic oscillation and the extraction of energy due to the amplification of the spontaneous emission light N are lessened, and the decrease in gain in the direction of the optic axis 6 is reduced. Therefore, it is possible to obtain a high-power laser output.

Figure 9:
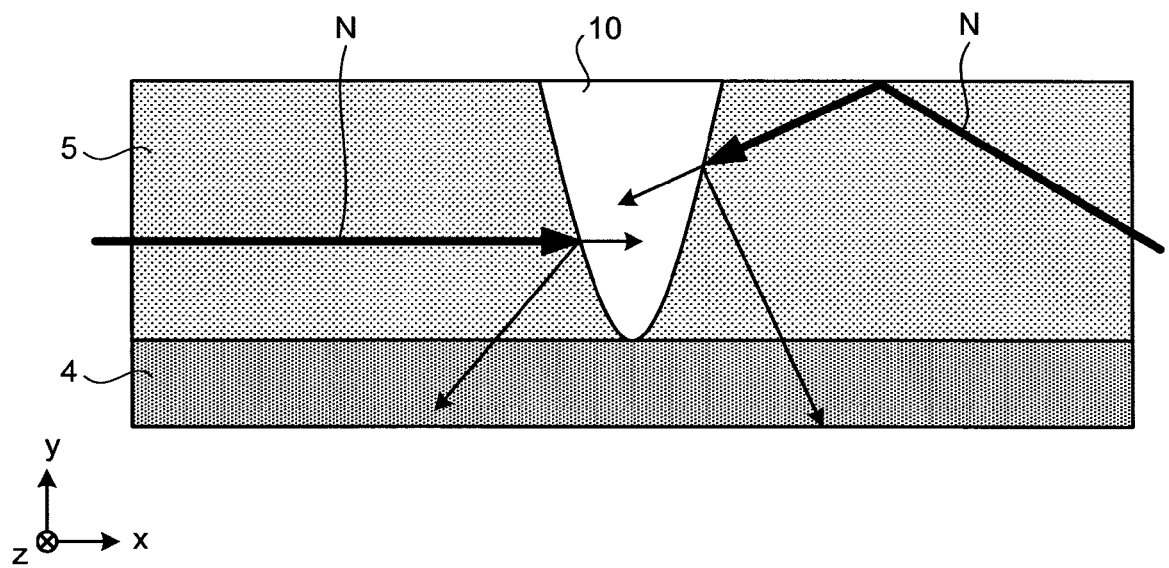
FIG. 9 is an enlarged view (3) of the portion B shown in FIG. 3.

Incidentally, a cross-section shape of the x-y plane of the groove 10 is not limited to a rectangular shape, and the x-y plane can be a cross section in a shape other than the rectangular shape, such as a trapezoidal shape, a triangular shape, a mountain-like shape, or a shape having a curved surface. FIG. 9 is an enlarged view (3) of the portion B shown in FIG. 3. In the wavelength conversion laser device 100 shown in FIG. 9, the side surface of the groove 10 (a cross-section shape of the x-y plane of the groove 10) has a shape inclined to the y-axis direction. In other words, the groove 10 is provided in the laser medium at a predetermined angle to the y-axis direction.

In the wavelength conversion laser device 100, the side surface of the groove 10 is inclined to the y-axis direction, so that a reflection angle of the spontaneous emission light N reflected by the side surface of the groove 10 is increased. Therefore, the spontaneous emission light N reflected by the side surface of the groove 10 deviates from the condition of the total reflection of the waveguide, and leaks out of the waveguide. Consequently, the parasitic oscillation and the extraction of energy due to the amplification of the spontaneous emission light N are lessened, and a decrease in gain in the direction of the optic axis 6 is reduced. Therefore, it is possible to obtain a high-power laser output.

Figure 10:
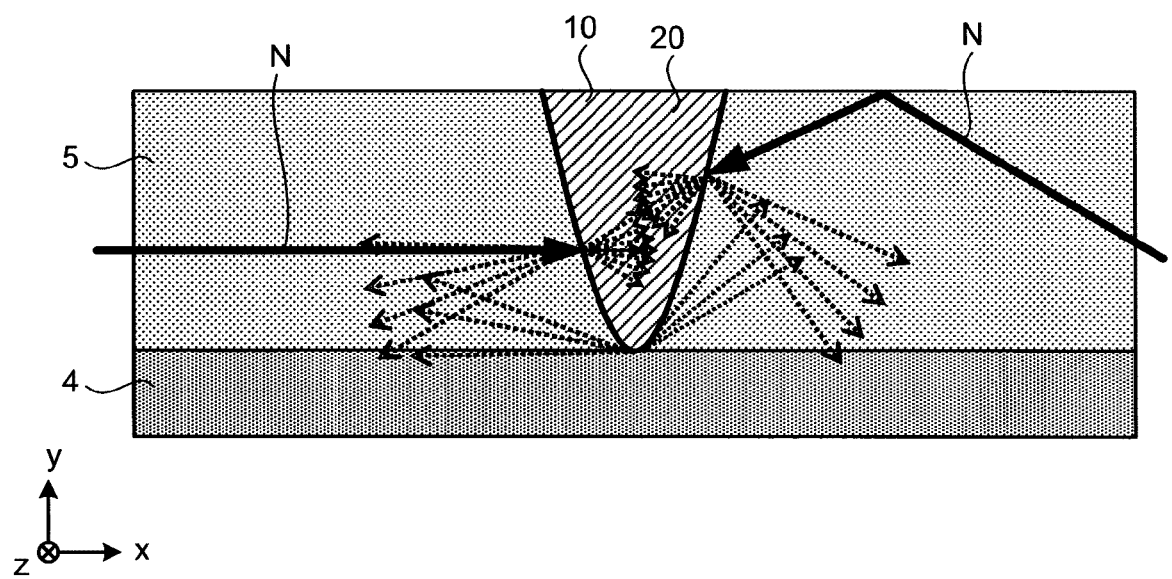
FIG. 10 is an enlarged view (4) of the portion B shown in FIG. 3.

FIG. 10 is an enlarged view (4) of the portion B shown in FIG. 3. In the wavelength conversion laser device 100 shown in FIG. 10, the side surface of the groove 10 (a cross-section shape of the x-y plane of the groove 10) has a shape inclined to the y-axis direction, the side surface of the groove 10 is a roughened surface, and the absorbing agent 20 is provided inside the groove 10. In this manner, the wavelength conversion laser device 100 in FIG. 10 has a structure of a combination of two or more structures for suppressing energy extracted by the amplification of the spontaneous emission light N (extraction-energy suppressing structures). Thus, in the wavelength conversion laser device 100 in FIG. 10, a distance for the spontaneous emission light N reflected by the side surface of the groove 10 to be propagated through the laser medium 5 and a rate of a component causing the spontaneous emission light N to be propagates in the x-direction can be further reduced than a case where one extraction-energy control structure is formed. Consequently, the parasitic oscillation and the extraction of energy due to the amplification of the spontaneous emission light N can be further lessened than a case where one extraction-energy control structure is formed, and also a decrease in gain in the direction of the optic axis 6 can be further reduced than a case where one extraction-energy control structure is formed. Therefore, it is possible to obtain a higher-power laser output than a case where one extraction-energy control structure is formed.

Figure 11:
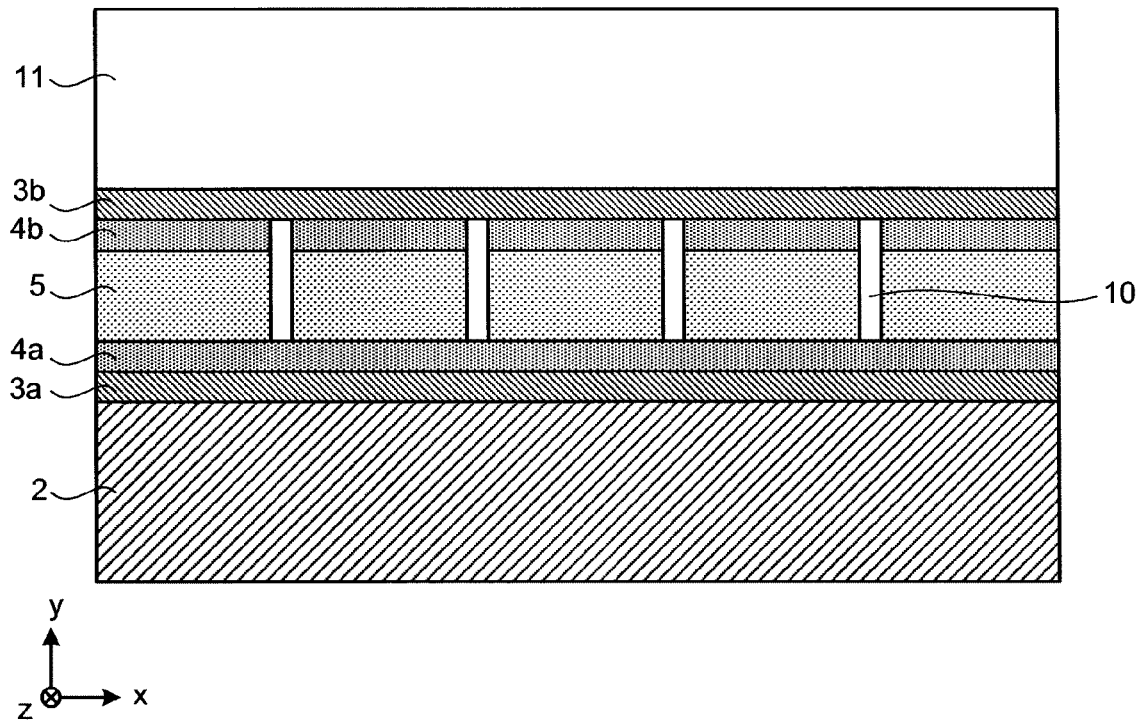
FIG. 11 is a cross-sectional view (3) along the line a-a' shown in FIG. 1.

Incidentally, the configuration of the cross section of the wavelength conversion laser device 100 along the line a-a' is not limited to those shown in FIGS. 3 and 4. FIG. 11 is a cross-sectional view (3) along the line a-a' shown in FIG. 1. As shown in FIG. 11, the laser medium 5 can be sandwiched between two claddings 4a and 4b that have a smaller refractive index than that of the laser medium 5 and are bonded to the surfaces of the laser medium 5 parallel to the x-z plane so as to be opposed to each other. In other words, it can be configured that the principal surfaces (the front and rear surfaces) of the laser medium 5 are sandwiched between the two claddings 4a and 4b opposed to each other. In this way, the laser medium 5 is configured to be sandwiched between the two claddings 4a and 4b on the lower and upper surface sides in the y-direction, so that the waveguide mode is improved in symmetry in the y-direction, and a beam quality of the laser beam output from the laser medium 5 is improved.

When the laser medium 5 is sandwiched between the claddings 4a and 4b, the cladding 4a is provided on the lower surface side of the laser medium 5, and the cladding 4a and the heat sink 2 are bonded by a bonding agent 3a. And, the cladding 4b is provided on the upper surface side of the laser medium 5, and the cladding 4b and a substrate 11 are bonded by a bonding agent 3b.

Incidentally, there is no need to provide the substrate 11 on the lower surface of the laser medium 5 (on the side of the cladding 4a) of the wavelength conversion laser device 100. When the substrate 11 is provided on the laser medium 5, the substrate 11 and the laser medium 5 can be directly bonded via the bonding agent 3b, or the substrate 11 and the laser medium 5 can be bonded via the bonding agent 3b and the cladding 4b.

Incidentally, when the laser medium 5 is sandwiched between the claddings 4a and 4b, the grooves 10 can be formed so that the grooves 10 of the laser medium 5 penetrate through the cladding 4a or 4b. FIG. 11 shows a case where the grooves 10 penetrate through the cladding 4b, and the grooves 10 are formed to extend up to the position of the bonding agent 3b.

In this manner, in the wavelength conversion laser device 100 in FIG. 11, the substrate 11 is provided on top of the laser medium 5, so that even when the laser medium 5 is divided by the grooves 10, the stiffness of the solid-state laser element 50 is improved, and the reliability of the solid-state laser element 50 is improved.

Figure 12:
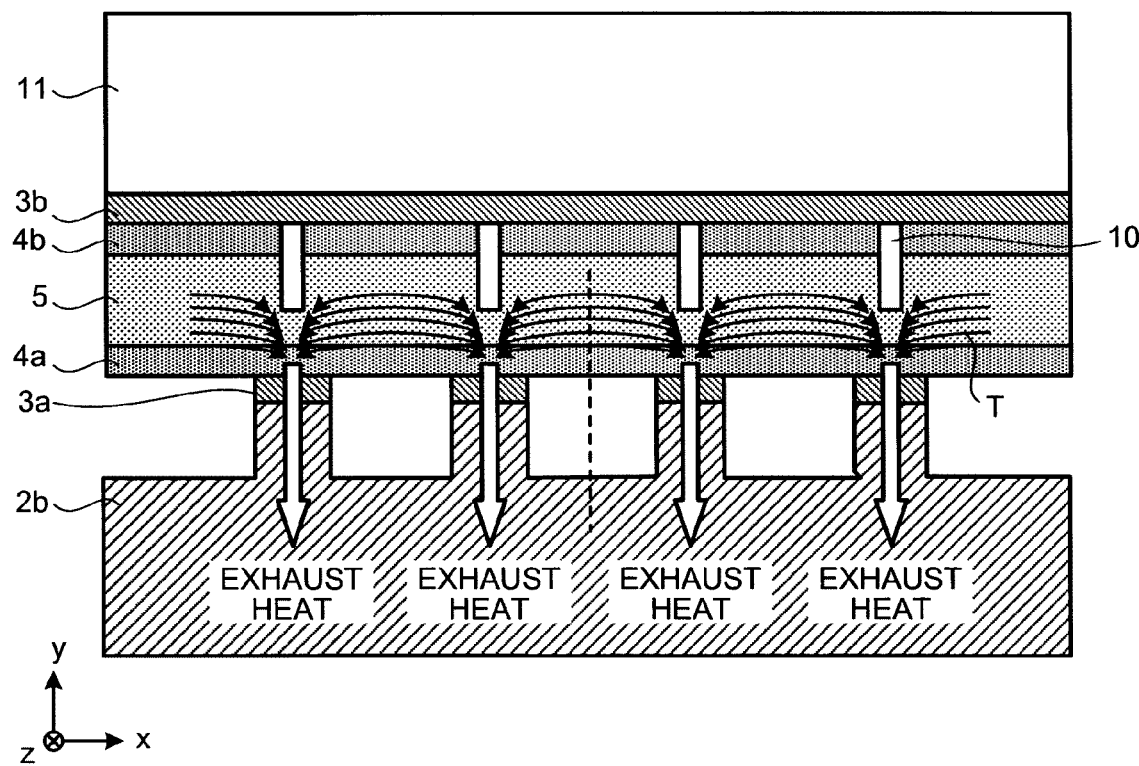
FIG. 12 is a cross-sectional view (4) along the line a-a' shown in FIG. 1.

FIG. 12 is a cross-sectional view (4) along the line a-a' shown in FIG. 1. In the laser medium 5, a portion of power of the absorbed excitation light is converted into heat energy, and heat is generated. The generated heat is exhausted to the side of a heat sink (comb-shaped heat sink) 2b via the cladding 4a and the bonding agent 3a. FIG. 12 shows a case where the heat sink 2b is formed into comb teeth, and is bonded to the side of the laser medium 5 (the bonding agent 3a) on each tip portion of the comb teeth. In other words, the heat sink 2b is formed into comb teeth whose teeth are aligned in the x-axis direction. And, each tip portion of the comb teeth is bonded to the laser medium 5 on the side of the principal surface of the laser medium 5.

In the present embodiment, the heat sink 2 is bonded to the laser medium 5 so that each tip portion of the comb teeth is bonded to the laser medium 5 underneath each of the grooves 10 (the lower surface side in the y-axis direction). The extent of bonding of the laser medium 5 with the heat sink 2b by the bonding agent 3 is only the tip portions of the comb teeth, so that in the laser medium 5, the flow of heat (heat flow T) is generated from a substantially center portion of the part not bonded to the comb teeth in the x-direction (the neighborhood of an intermediate portion of the adjacent two comb teeth) (hereinafter, referred to as "an inter-comb-teeth intermediate portion") to the both sides in the x-axis direction. This is because, out of the laser medium 5, while heat generated in the laser medium 5 is exhausted from the part bonded to the tip portions of the comb teeth to the side of the heat sink 2b, the heat generated in the laser medium 5 is not exhausted from the part not bonded to the tip portions of the comb teeth to the side of the heat sink 2b. Consequently, in the laser medium 5, the inter-comb-teeth intermediate portion has the highest temperature, and the temperature gets lower with the approach of the tip portions of the comb teeth (bonded portions to the comb teeth).

An optical material such as the laser medium 5 changes a refractive index in approximately proportion to a temperature difference. When an optical material whose refractive-index change dn/dT per unit temperature is positive is used, in the laser medium 5, a refractive index of the inter-comb-teeth intermediate portion is large, and the refractive index gets smaller with the approach of the bonded portions to the comb teeth. This is because the inter-comb-teeth intermediate portion has the highest temperature in the laser medium 5. As a result, in the laser medium 5, the thermal lens effect in the x-axis direction is generated with each inter-comb-teeth intermediate portion treated as an optical axis.

Therefore, when the laser medium 5 is the optical material whose refractive-index change dn/dT is positive, the grooves 10 are arranged so that the position of which in the x-direction is located above the comb teeth of the heat sink 2b. Consequently, heat generated in the laser medium 5 passes underneath the grooves 10, and is exhausted into the heat sink 2b.

The laser beam in the laser medium 5 is almost uniformly excited in the x-axis direction by the semiconductor laser 1, and the comb teeth of the heat sink 2b are arranged at almost regular intervals in the x-axis direction. Therefore, the thermal lens effect is periodically generated in the x-axis direction. For example, when the number of the comb teeth of the heat sink 2b is m (m is the counting number), the same effect as that is achieved when the (m−1) numbers of lenses are aligned in approximately the x-axis direction at regular intervals can be achieved. The wavelength conversion laser device 100 can arbitrarily adjust the strength and period of the periodically-generated thermal lens effect by using the desired heat sink 2b, bonding agents 3a and 3b, and claddings 4a and 4b. In the wavelength conversion laser device 100, for example, by adjusting the interval of the comb teeth of the heat sink 2b, the width of the comb teeth, the length of the comb teeth (the height in the y-axis direction), the thermal conductivity of the heat sink 2b, the thermal conductivity of the bonding agent 3, the thickness of the bonding agent 3, a type of material of the cladding 4, and the thickness of the cladding 4, the desired thermal lens effect can be achieved.

When an optical material whose refractive-index change dn/dT per unit temperature is negative is used as the laser medium 5, the laser medium 5 has a refractive-index distribution opposite to a temperature distribution, and a refractive index at the bonded portion to the comb teeth is large, and a refractive index at the inter-comb-teeth intermediate portion is small. As a result, in the laser medium 5, the thermal lens effect in the x-axis direction is generated with the bonded portion to each of the comb teeth treated as an optical axis.

When the laser medium 5 is the material whose refractive-index change dn/dT is negative, the grooves 10 are arranged so that the position of which in the x-direction is to be the inter-comb-teeth intermediate portion. Consequently, heat generated in the laser medium 5 is exhausted from the inter-comb-teeth intermediate portions into the heat sink 2b. For example, when the number of the comb teeth of the heat sink 2b is m, the same effect as that is achieved when the m-numbers of lenses are aligned in approximately the x-axis direction at regular intervals can be achieved.

In this manner, in the present embodiment, the heat sink 2b and the laser medium 5 are bonded at the position depending on a type of the laser medium 5 (a type classified by whether a refractive-index change is positive or negative or the like) and the position of the waveguide structure (the optical axis) so as to generate the thermal lens effect in the x-axis direction in the laser medium 5.

Incidentally, regardless of whether dn/dT is positive or negative, spaces between the comb teeth of the heat sink 2b can be filled with a heat insulation material having a smaller thermal conductivity than that of the heat sink 2b instead of the air. If it is configured in this way, the strength and distribution of the thermal lens effect of the heat sink 2b can be adjusted more finely than a case where the spaces between the comb teeth are filled with the air. Furthermore, by filling the comb teeth with the heat insulation material, the stiffness of the heat sink 2b can be enhanced.

If the heat sink 2b is configured in this manner, as the laser medium 5 and the nonlinear material 7 in the x-axis direction are a spatial resonator, with respect to the laser medium 5, the width of the waveguide in the x-axis direction can be arbitrarily set. Furthermore, as the semiconductor laser 1 in the x-axis direction is not required to have a high beam quality, by adjusting the widths of the laser medium 5 and the nonlinear material 7 in accordance with the width of the semiconductor laser 1 in the x-axis direction, a range of a light-emitting region of the semiconductor laser 1 in the x-axis direction can be freely set. Consequently, the wavelength conversion laser device 100 can perform a high-power operation of an excitation light with a broad-area LD that facilitates the high-power operation and has a wide light-emitting region or a multi-emitter LD in which emitters are arranged in a line, and can output a high-power second harmonic laser beam. Furthermore, amplification of a spontaneous emission light in a direction including a component of the x-direction (an unintended direction) can be prevented by the grooves 10, so that a parasitic oscillation and an extraction of energy due to the amplification of the spontaneous emission light can be lessened, and it is possible to obtain a high-power laser beam in the direction of the optic axis 6.

Figure 13:
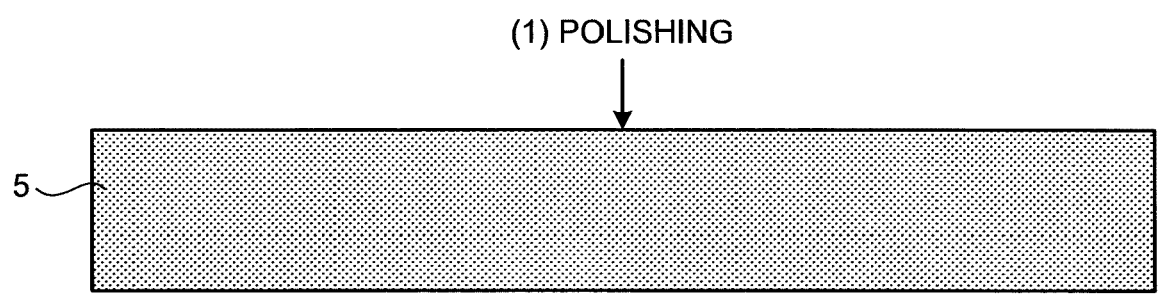
FIG. 13 is a diagram (1) for explaining a procedure for producing a solid-state laser element.
Figure 14:
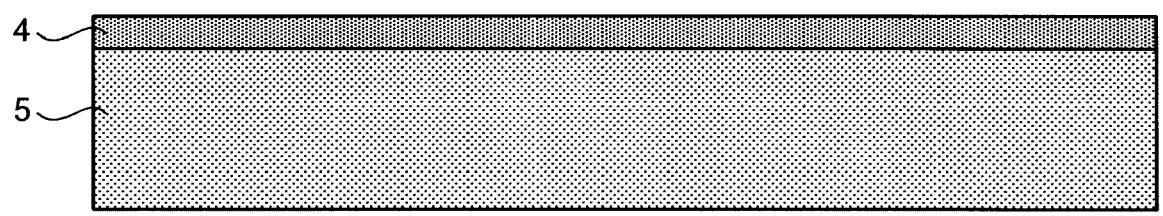
FIG. 14 is a diagram (2) for explaining the procedure for producing the solid-state laser element.

The thickness of the laser medium 5 in the y-axis direction is several to several tens μm, so that it is difficult to produce the laser medium 5 alone. Consequently, in the present embodiment, the solid-state laser element 50 (the laser medium 5) is produced, for example, by a method illustrated in FIGS. 13 to 20. As illustrated in FIG. 13, first, one of the principal surfaces (the front surface side) of the laser medium 5 is polished (1). Then, as illustrated in FIG. 14, from the side of the surface of the laser medium 5 subjected to the polishing (the polished surface), the cladding (optical film) 4 having a smaller refractive index than that of the laser medium 5 is produced on the laser medium 5. Instead of the cladding 4, the substrate 11 having a smaller refractive index than that of the laser medium 5 can be directly bonded to the polished surface of the laser medium 5 by optical contact, diffusion bonding, or the like, or the substrate 11 constructed of metal or an optical material can be bonded to the polished surface of the laser medium 5 by an optical adhesive having a smaller refractive index than that of the laser medium 5.

Figure 15:
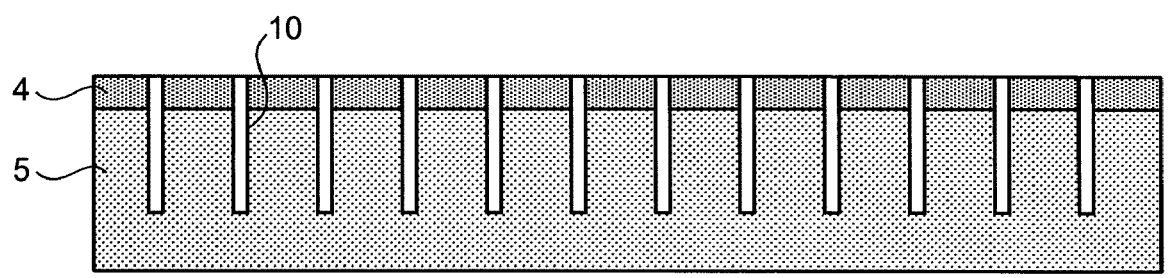
FIG. 15 is a diagram (3) for explaining the procedure for producing the solid-state laser element.

After that, as illustrated in FIG. 15, the grooves 10 are cut in the cladding 4 from the top up to the laser medium 5. At this time, each of the grooves 10 is cut so that each of the grooves 10 is parallel to the optical axis direction. When the grooves 10 are cut only in the laser medium 5, after the laser medium 5 is polished, the grooves 10 are cut in the laser medium 5, and then the cladding 4 is formed on the laser medium 5.

The grooves 10 can be cut by a tapered hard blade or the like, or the cladding 4 and/or the laser medium 5 can be processed by a short-wavelength laser, such as an excimer laser, or an ultrashort pulse laser, such as a femtosecond laser. When the ultrashort pulse laser is used, the inside of the laser medium 5 can be directly processed through the substrate 11 or the cladding 4, so that processing for the grooves 10 can be performed at any process step. When an ablation process is performed on the surface by the excimer laser or the like, the side surface of the groove 10 is a roughened surface, so that there is no need to perform a roughening process on the side surface separately.

An oxide of the laser medium that is produced in the ablation process may sometimes be attached to the side surface of inside the cut groove 10. In this case, the oxide of the laser medium 5 may sometimes be a good absorber of a spontaneous emission light, so that it may not necessary to fill the grooves 10 with the absorbing agent separately. When the absorbing agent is filled in the grooves 10, after the grooves 10 are filled with the absorbing agent, the absorbing agent attached to the surface of the cladding 4 is removed by etching, polishing, or washing.

Figure 16:
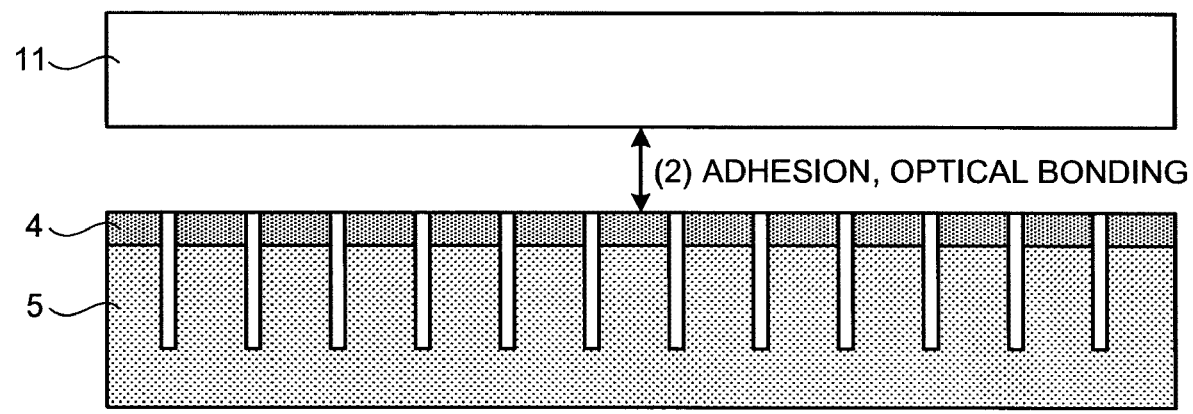
FIG. 16 is a diagram (4) for explaining the procedure for producing the solid-state laser element.
Figure 17:
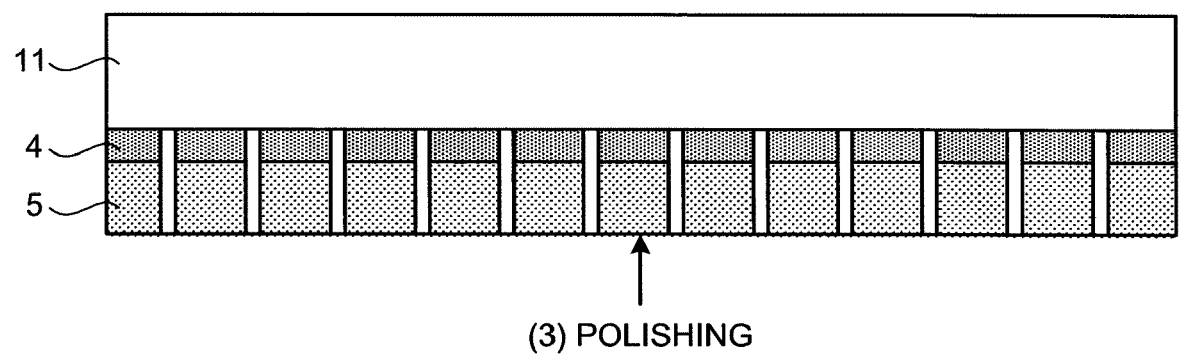
FIG. 17 is a diagram (5) for explaining the procedure for producing the solid-state laser element.

After the grooves 10 are formed on the laser medium 5 and the like, as illustrated in FIG. 16, the substrate 11 is adhered to the cladding 4, and bonded to the cladding 4 by optical contact, diffusion bonding, or the like (2). Then, as illustrated in FIG. 17, a surface of the laser medium 5 opposed to the surface bonded with the substrate 11 (the rear surface of the laser medium 5) is polished, and the laser medium 5 is scraped to a desired thickness (3).

Figure 18:
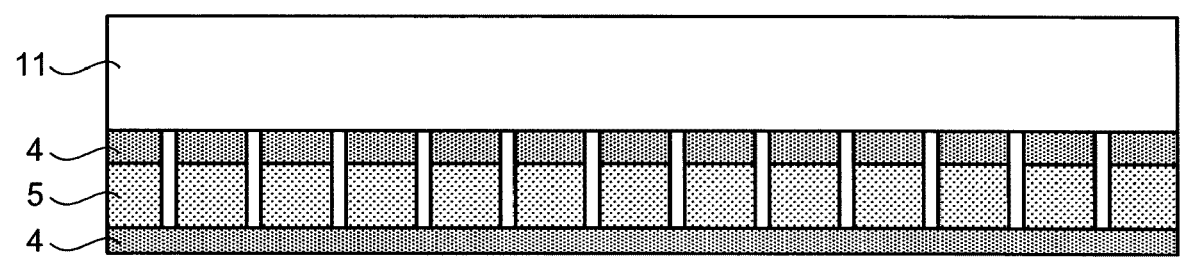
FIG. 18 is a diagram (6) for explaining the procedure for producing the solid-state laser element.

As illustrated in FIG. 18, the cladding 4 having a smaller refractive index than that of the laser medium 5 is bonded to the rear surface (the surface opposed to the surface bonded with the substrate 11) of the laser medium 5 by vapor deposition, optical bonding, or a method with an optical adhesive. In this manner, a waveguide composed of an integrated combination of the laser medium 5, the substrate 11, and the claddings 4 is produced.

Figure 19:
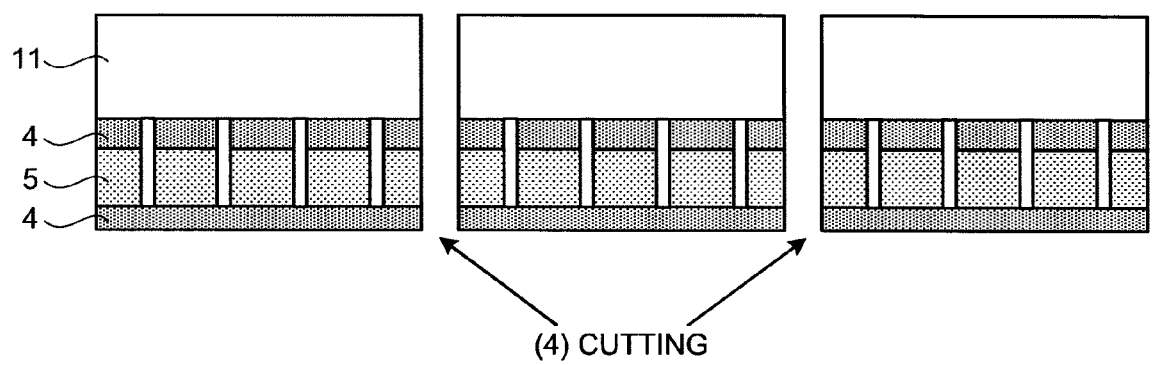
FIG. 19 is a diagram (7) for explaining the procedure for producing the solid-state laser element.
Figure 20:
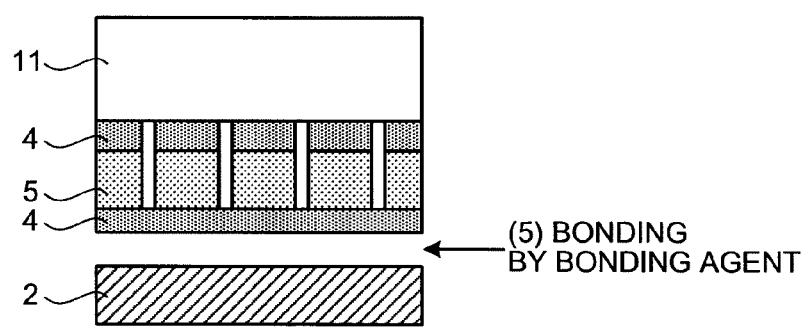
FIG. 20 is a diagram (8) for explaining the procedure for producing the solid-state laser element.

As illustrated in FIG. 19, the waveguide produced by integrating the laser medium 5, the substrate 11, and the claddings 4 (the solid-state laser element 50) is cut (4), and a plurality of waveguides in desired size are produced. Then, as illustrated in FIG. 20, the heat sink 2 is bonded to the cladding 4 by a bonding agent (5). As above, a plurality of waveguides can be produced at one time, and thus production costs of the waveguides can be reduced.

Incidentally, the waveguide produced by integrating the laser medium 5, the substrate 11, and the claddings 4 can be bonded to the heat sink 2 by the bonding agent while being in an integrated state, and then cut into a plurality of waveguides. Furthermore, if the laser medium 5 alone has the sufficient stiffness, the substrate 11 can be removed after the waveguide is formed.

There is described a case where a blue laser using Nd:YVO$_4$ and Nd:GdVO$_4$ in the laser medium 5 is used as the laser medium 5. In the waveguide type wavelength conversion laser device 100 shown in FIG. 1, depending on a gain/loss ratio of the waveguide mode, a linearly polarization due to the oscillation of laser is frequently obtained. Therefore, even when the fundamental laser beam is required to have a linearly polarization in the wavelength conversion, it is possible to output the high-brightness fundamental laser beam suitable for the wavelength conversion. Furthermore, when laser media that differ in gain according to directions of respective crystal axes (Nd:YVO$_4$, Nd:GdVO$_4$) are used as the laser medium 5, a linearly polarized oscillation in a direction of the higher gain can be easily obtained, so that even when the fundamental laser beam is required to have a linearly polarization in the wavelength conversion, it is possible to output the high-brightness fundamental laser beam suitable for the wavelength conversion.

The blue laser uses a laser medium that outputs a laser beam having a wavelength in the 900 nm band as a fundamental wave, and can obtain a second harmonic wave by performing wavelength conversion of the fundamental wave. Nd:YVO$_4$ or Nd:GdVO$_4$ has a gain band at the neighborhood of 914 nm, so that by using Nd:YVO$_4$ or Nd:GdVO$_4$ in the laser medium 5, a blue laser at the neighborhood of 457 nm can be obtained.

In Nd:YVO$_4$ and Nd:GdVO$_4$, a wavelength having the highest gain is the 1064 nm band, and a wavelength in the 1.3 μm band also have a gain. Therefore, to oscillate a fundamental wave in the 914 nm band efficiently, it is necessary to suppress an oscillation of laser in the 1064 nm band having the highest gain, a parasitic oscillation, an extraction of energy due to amplification of a spontaneous emission light in an unintended direction, and an oscillation in the 1.3 μm band.

To suppress an oscillation of laser in the 1064 nm band or the 1.3 μm band in the direction of the optic axis 6, the total reflection film (the end surface 5a) of the laser medium 5 that reflects a fundamental laser beam shall be, for example, a film that totally reflects a wavelength in the 914 nm band, the fundamental wave of the blue laser, and lets a wavelength in the 1064 nm band or the 1.3 μm band therethrough. Furthermore, the antireflection film (the end surface 5b) that lets the fundamental laser beam therethrough shall be, for example, a film that lets all wavelengths in the 914 nm band, the 1064 nm band, and the 1.3 μm band therethrough. Moreover, the optical film (the end surface 7a) of the nonlinear material 7 that lets the fundamental laser beam therethrough and reflects the second harmonic laser beam shall be, for example, a film that lets all wavelengths in the 914 nm band, the 1064 nm band, and the 1.3 μm band therethrough. The optical film (the end surface 7b) that reflects the fundamental laser beam and lets the second harmonic laser beam therethrough shall be, for example, a film that totally reflects a wavelength in the 914 nm band and lets a wavelength in the 1064 nm or 1.3 μm band therethrough.

By such a film configuration of the laser medium 5, the wavelength conversion laser device 100 can cause a laser in the 914 nm band to oscillate between the total reflection film (the end surface 5a) that reflects the fundamental laser beam and the optical film (the end surface 7b) that reflects the fundamental laser beam and lets the second harmonic laser beam therethrough while suppressing an oscillation of laser in the 1064 nm band and the 1.3 μm band in the direction of the optic axis 6. Consequently, a blue laser in the 457 nm band that is converted into a second harmonic wave by the nonlinear material 7 is output.

For example, when a second harmonic wave is generated with a fundamental wave of a wavelength in the 1064 nm band, a second harmonic laser in the 532 nm band is output from the nonlinear material 7, so that a green laser can be obtained. In this case, the wavelength in the 1064 nm band has a high gain, a laser oscillation threshold is decreased, so that the oscillation of laser in the direction of the optic axis 6 can be easily performed. Furthermore, as the laser oscillation threshold is low, a gain remaining in the laser medium 5 is decreased, and a parasitic oscillation in an unintended direction other than the direction of the optic axis 6, an extraction of energy due to the amplification of the spontaneous emission light, and an oscillation of laser of other wavelengths, such as in the 914 nm band or the 1.3 μm band, in the direction of the optic axis 6 are less likely to be generated. Consequently, even when a planar waveguide laser performs a high-power operation of a laser beam by widening a beam diameter in the y-direction or converting the laser beam into multiple beams, a parasitic oscillation of the laser beam propagated at an angle including the x-direction or an extraction of energy due to the amplification of the spontaneous emission light is less likely to be generated. Therefore, a high-power green laser can be easily obtained.

When a wavelength in the 914 nm band having a low gain is set as a fundamental wave, a laser oscillation threshold is increased because the gain is low. Therefore, even when an oscillation of laser in the 1064 nm band and the 1.3 μm band in the direction of the optic axis 6 is suppressed by the film configuration of the laser medium 5, as the laser oscillation threshold is high, a gain in an unintended angular direction including the x-direction is also increased, and an unintended parasitic oscillation or an extraction of energy due to the amplification of the spontaneous emission light may sometimes be generated. Furthermore, when the planar waveguide laser performs a high-power operation of a laser beam by widening a beam diameter in the y-direction or converting the laser beam into multiple beams, a gain in the angular direction including the x-direction is increased, and a parasitic oscillation is more likely to be generated. Moreover, even if it does not reach the parasitic oscillation, an extraction of energy due to the amplification of the spontaneous emission light is increased because a propagation distance of the laser beam is long, and a gain in the direction of the optic axis 6 is reduced. Consequently, an output of the fundamental laser in the 914 nm band in the direction of the optic axis 6 is reduced, and an output of a second harmonic blue laser may also be reduced.

In the present embodiment, the laser medium 5 of the planar waveguide type laser device (the solid-state laser element 50) is configured that the grooves 10 are arranged between respective optical axes of a plurality of LD beams output from a plurality of the active layers 1a so as to be substantially parallel to the optic axis 6. Consequently, a spontaneous emission light propagated through the laser medium 5 at an angle including the x-direction can be suppressed, and a parasitic oscillation causing the spontaneous emission light to oscillate at the angle including the x-direction (an unintended angle) can be suppressed. Even if it does not reach the parasitic oscillation, an extraction of energy due to amplification of the spontaneous emission light can be suppressed.

Therefore, even when an oscillation of laser is performed with 914 nm having a high laser oscillation threshold set as a fundamental wave, the wavelength conversion laser device 100 can obtain a high-power fundamental laser beam because a decrease in gain due to the extraction of energy is small. Furthermore, as the fundamental laser output is high, a wavelength conversion efficiency in the nonlinear material 7 is increased, and a blue laser, a high-power second harmonic laser beam, can be obtained.

By the way, in the wavelength conversion laser device 100, a laser is oscillated in the laser medium 5 between the two grooves 10. At this time, when a beam diameter of the oscillated laser beam in the x-direction is large with respect to a distance between the two grooves 10, the laser beam is obstructed by the grooves 10, which results in a loss, and a high-power laser output may not be able to be obtained.

Therefore, when the wavelength conversion laser device 100 sandwiches the laser medium 5 between the claddings 4a and 4b, the configuration of the cross section of the wavelength conversion laser device 100 along the line a-a' can be changed to another configuration different from the configuration shown in FIG. 11.

Figure 21:
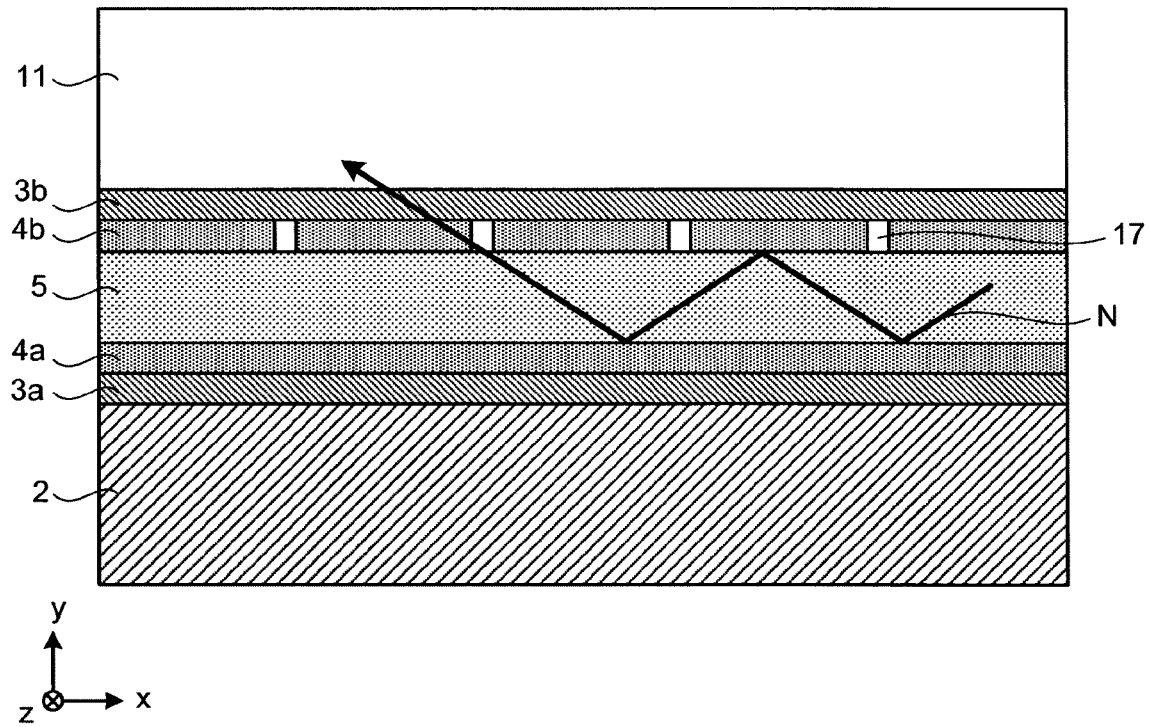
FIG. 21 is a cross-sectional view (5) along the line a-a' shown in FIG. 1.
Figure 22:
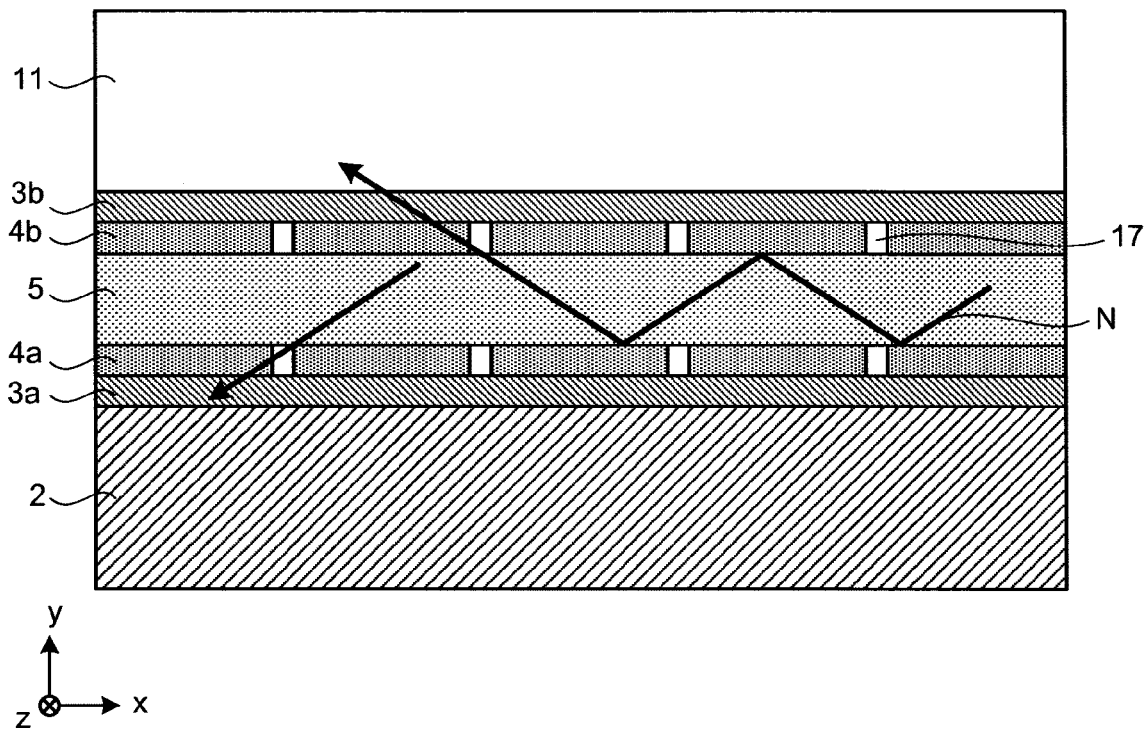
FIG. 22 is a cross-sectional view (6) along the line a-a' shown in FIG. 1.

FIG. 21 is a cross-sectional view (5) along the line a-a' shown in FIG. 1, and FIG. 22 is a cross-sectional view (6) along the line a-a' shown in FIG. 1. FIGS. 21 and 22 show variations of the wavelength conversion laser device 100 shown in FIG. 11.

In the wavelength conversion laser device 100 in FIG. 21, one to a plurality of grooves (groove wall surfaces) 17 are formed on the cladding 4b. In the wavelength conversion laser device 100 in FIG. 22, one to a plurality of the grooves (groove wall surfaces) 17 are formed on both of the claddings 4a and 4b.

The groove 17 of the cladding 4a or 4b has the same configuration as the groove 10 of the laser medium 5. Namely, the grooves 17 of the cladding 4a, 4b are each arranged so that the respective groove wall surfaces are aligned in a direction substantially parallel to the optic axis 6. The groove wall surface of each groove 17 extends from the end surface 5a to the end surface 5b in the direction of the optic axis 6 while being in the perpendicular direction to the principal surface of the cladding 4a, 4b. Each of the grooves 17 is arranged between respective LD beams output from the respective active layers 1a of the semiconductor laser 1 (between corresponding optical axes of respective LD beams). Consequently, each of the claddings 4a and 4b in the present embodiment is optically divided into several pieces by the grooves 17.

In this manner, by arranging the grooves 17 in the claddings 4a and 4b or in the cladding 4b, a portion of a spontaneous emission light can be caused to leak out of the cladding 4a, 4b through the grooves 17. Therefore, an extraction of the spontaneous emission light is suppressed, and it is possible to prevent a parasitic oscillation causing the spontaneous emission light to oscillate at an angle including the x-direction. Furthermore, even if the spontaneous emission light does not reach the parasitic oscillation, it is possible to prevent an extraction of energy due to amplification of the spontaneous emission light.

Furthermore, by configuring the grooves 17 to be arranged in the claddings 4a and 4b or in the cladding 4b and not to be arranged in the laser medium 5, even in an oscillation of laser whose beam diameter in the x-direction is large, it is possible to obtain a high-power laser beam with a small loss.

Figure 23:
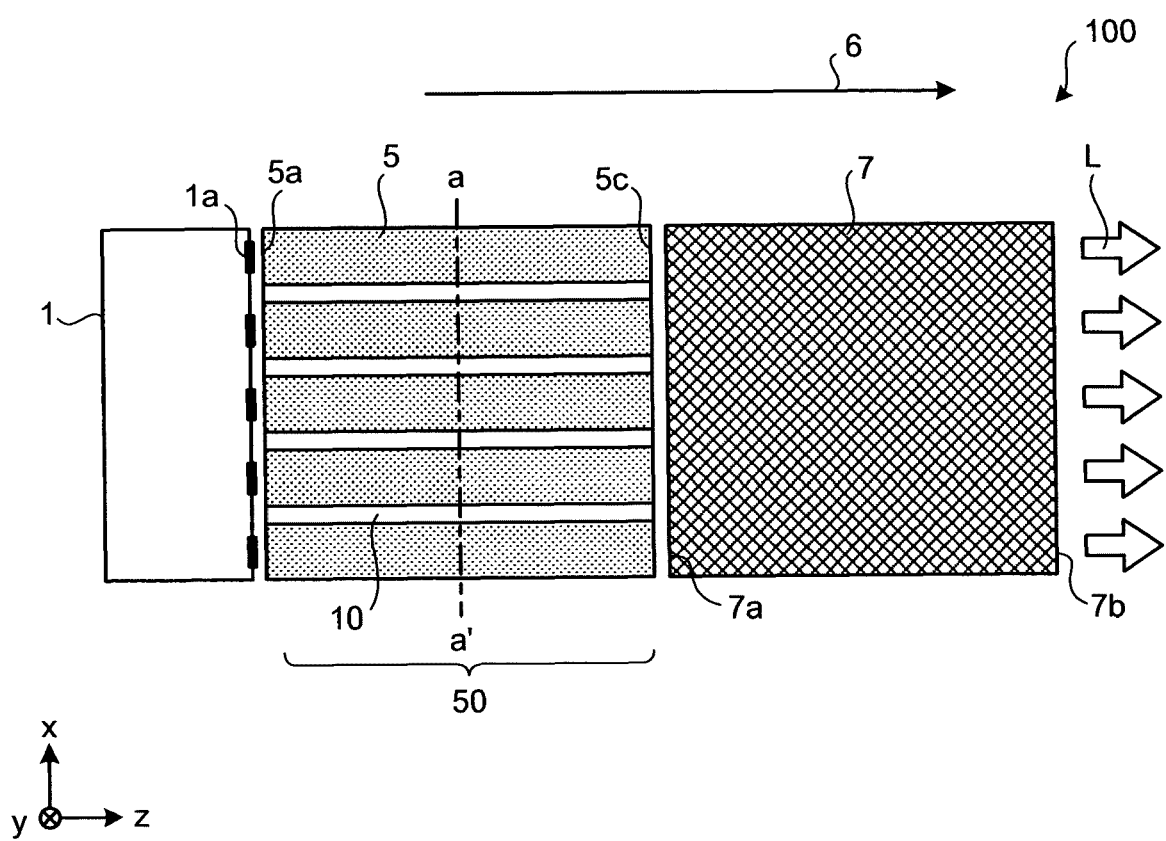
FIG. 23 is a top view illustrating a configuration of the wavelength conversion laser device employing an external wavelength conversion method.

Incidentally, in FIG. 1 and the like, there is described a case where the wavelength conversion laser device 100 causes a fundamental wave to oscillate between the total reflection film (the end surface 5a) of the laser medium 5 and the optical film (the end surface 7b) of the nonlinear material 7, and employs an internal wavelength conversion method in which the nonlinear material 7 is arranged in the fundamental-wave oscillator. Alternatively, the wavelength conversion laser device 100 can perform a wavelength conversion by a method other than the internal wavelength conversion method (an external wavelength conversion method). In the external wavelength conversion method, a wavelength conversion element is provided outside of the resonator. For example, as shown in FIG. 23, a partial reflection film that reflects a portion of a fundamental laser beam (an end surface 5c) is formed on one of the end surfaces of the laser medium 5 (the side surface opposed to the end surface 5a, and the side surface on the side adjacent to the nonlinear material 7), and the wavelength conversion laser device 100 performs an oscillation of a fundamental laser beam between the both end surfaces 5a and 5c of the laser medium 5. In this case, the fundamental wave output from the laser medium 5 is incident on the nonlinear material 7, and subjected to wavelength conversion in the nonlinear material 7, and a second harmonic laser beam L is obtained.

In such an external wavelength conversion method, in the same manner as in the internal wavelength conversion method, a parasitic oscillation in an unintended direction can be suppressed, and an extraction of energy due to amplification of a spontaneous emission light in the unintended direction can be suppressed. Therefore, even when the wavelength conversion laser device 100 employs the external wavelength conversion method, a high-power fundamental wave in the direction of the optic axis 6 can be obtained, and as a result, it is possible to obtain a high-power second harmonic laser beam.

Incidentally, in the present embodiment, there is described a case where reflection and absorption are performed while a spontaneous emission light N is scattered and diffused by the side surface of the groove 10; however, as shown in FIG. 4, when the groove 10 has a bottom surface, reflection and absorption can be performed while the spontaneous emission light N is scattered and diffused by the bottom surface of the groove 10.

In this manner, according to the present embodiment, with respect to the laser medium 5, the grooves 10 substantially parallel to the optic axis 6 are arranged between corresponding optical axes of LD beams output from the semiconductor laser 1 thereby shortening a propagation distance of the spontaneous emission light N in the x-direction, so that amplification of the spontaneous emission light N in the x-direction is reduced. Therefore, a parasitic oscillation in a direction of other than the optic axis 6 and an extraction of energy due to the amplification of the spontaneous emission light N are lessened, and a decrease in gain in the direction of the optic axis 6 is reduced. Consequently, the solid-state laser element 50 can output a high-power laser, and the wavelength conversion laser device 100 can obtain a high-power laser output.

INDUSTRIAL APPLICABILITY

As above, the solid-state laser element according to the present invention is suitable for a laser output with a planar waveguide.

The invention claimed is:

1. A planar waveguide type solid-state laser element, comprising:
a flat plate-like laser medium that forms a waveguide structure in a thickness direction, which is a direction perpendicular to a principal surface of the flat plate-like laser medium, and causes a plurality of fundamental laser beams to oscillate in an optical axis direction within the flat plate-like laser medium, wherein the flat plate-like laser medium is separated in a principal-surface width direction, which is a direction perpendicular to the optical axis direction and the thickness direction, by at least one groove extending in the optical axis direction and partially through the flat plate-like laser medium.

2. The solid-state laser element according to claim 1, wherein the at least one groove includes a plurality of grooves extending in the optical axis direction and partially through the flat plate-like laser medium, and the grooves are aligned in the principal-surface width direction, and provided between respective optical axes of the plurality of fundamental laser beams.

3. The solid-state laser element according to claim 1, wherein the groove has a roughened surface in a sidewall extending in an optical axis direction that scatters a spontaneous emission light generated in the flat plate-like laser medium.

4. The solid-state laser element according to claim 1, further comprising an absorbing agent inside the groove that absorbs a spontaneous emission light generated in the flat plate-like laser medium.

5. The solid-state laser element according to claim 1, wherein the groove is provided from one side of the principal surface of the flat plate-like laser medium to an other side at a predetermined angle to the thickness direction.

6. A planar waveguide type solid-state laser element, comprising:

a flat plate-like laser medium that forms a waveguide structure in a thickness direction, which is a direction perpendicular to a principal surface of the flat plate-like laser medium, and causes a plurality of fundamental laser beams to oscillate in an optical axis direction within the flat plate-like laser medium; and a heat sink including comb teeth that are aligned in a principal-surface width direction, the comb teeth including tip portions that are each bonded to the flat plate-like laser medium on a side of the principal surface of the flat plate-like laser medium so as to absorb heat generated in the flat plate-like laser medium, wherein the flat plate-like laser medium is separated in the principal-surface width direction, which is a direction perpendicular to the optical axis direction and the thickness direction, by a groove extending in the optical axis direction and partially through the flat plate-like laser medium, and the heat sink is bonded to the flat plate-like laser medium and the waveguide structure at a position in which a thermal lens effect is generated in the flat plate-like laser medium in the principal-surface width direction.

7. A planar waveguide type solid-state laser element that causes a plurality of fundamental laser beams to oscillate in an optical axis direction within a flat plate-like laser medium, and forms a waveguide structure in a thickness direction, which is a direction perpendicular to a principal surface of the flat plate-like laser medium, the solid-state laser element comprising:

a cladding that is bonded to the principal surface of the flat plate-like laser medium, and has a smaller refractive index than that of the flat plate-like laser medium, wherein the cladding is separated in a principal-surface width direction, which is a direction perpendicular to the optical axis direction and the thickness direction, by a groove extending in the optical axis direction and partially through the flat plate-like laser medium.

8. The solid-state laser element according to claim 4, wherein the groove is completely filled with the absorbing agent.

9. The solid-state laser element according to claim 6, wherein the comb teeth and the flat plate-like laser medium are bonded together to form air gaps in spaces between the comb teeth.

10. The solid-state laser element according to claim 6, wherein the comb teeth and the flat plate-like laser medium are bonded together to form gaps in spaces between the comb teeth, and the gaps are filled with a heat insulating material.

11. The solid-state laser element according to claim 10, wherein the heat insulating material has a smaller thermal conductivity than that of the heat sink.

12. The solid-state laser element according to claim 6, wherein the tip portions of the comb teeth of the heat sink are aligned with the plurality of grooves.

* * * * *